US012287288B2

(12) United States Patent
Takeshita et al.

(10) Patent No.: US 12,287,288 B2
(45) Date of Patent: Apr. 29, 2025

(54) OPTICAL MEASUREMENT DEVICE AND OPTICAL MEASUREMENT METHOD

(71) Applicant: HAMAMATSU PHOTONICS K.K., Hamamatsu (JP)

(72) Inventors: Teruo Takeshita, Hamamatsu (JP); Tomokazu Matsumura, Hamamatsu (JP); Fusanori Kondo, Hamamatsu (JP); Naoki Iwata, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 1056 days.

(21) Appl. No.: 17/284,279

(22) PCT Filed: Oct. 24, 2019

(86) PCT No.: PCT/JP2019/041779
§ 371 (c)(1),
(2) Date: Apr. 9, 2021

(87) PCT Pub. No.: WO2020/085452
PCT Pub. Date: Apr. 30, 2020

(65) Prior Publication Data
US 2021/0389249 A1    Dec. 16, 2021

(30) Foreign Application Priority Data
Oct. 25, 2018 (JP) .................. 2018-200986

(51) Int. Cl.
*G01N 21/64* (2006.01)
(52) U.S. Cl.
CPC ..... *G01N 21/6486* (2013.01); *G01N 21/6428* (2013.01)
(58) Field of Classification Search
CPC ............. G01N 21/6428; G01N 21/645; G01N 21/6408; G01N 21/6458
See application file for complete search history.

(56) References Cited

U.S. PATENT DOCUMENTS 5,257,202 A * 10/1993 Feddersen ............. G01J 3/4406
702/32
5,270,548 A * 12/1993 Steinkamp ......... G01N 21/6408
250/461.1
(Continued)

FOREIGN PATENT DOCUMENTS

CN   102150035 A   8/2011
CN   102159937 A   8/2011
(Continued)

OTHER PUBLICATIONS

Collier B. Bradley et al., "Time-resolved measurements of luminescence", Journal of Luminescence, Elsevier BV North-Holland, NL, vol. 144, Jul. 5, 2013, p. 180-p. 190, XP028714938.
(Continued)

*Primary Examiner* — David P Porta
*Assistant Examiner* — Meenakshi S Sahu
(74) *Attorney, Agent, or Firm* — Faegre Drinker Biddle & Reath LLP

(57) ABSTRACT

An optical measurement device includes a light detection element for detecting detection light including fluorescence generated from an immuno-chromatography test piece irradiated with excitation light and scattered light caused by the excitation light and having a phase equivalent to that of the excitation light, and a cancel circuit for processing a detection signal corresponding to the detection light. The cancel circuit removes a signal component corresponding to the scattered light from the detection signal on the basis of a phase difference between the fluorescence and the scattered light.

12 Claims, 16 Drawing Sheets

(56) References Cited

U.S. PATENT DOCUMENTS

| | | | |
|---|---|---|---|
| 5,504,337 A | 4/1996 | Lakowicz et al. | |
| 6,384,951 B1 * | 5/2002 | Basiji | G06K 7/10801 |
| | | | 356/417 |
| 2003/0062485 A1 | 4/2003 | Fernandez et al. | |
| 2004/0126780 A1 | 7/2004 | Rigler et al. | |
| 2011/0168916 A1 | 7/2011 | Doi et al. | |

FOREIGN PATENT DOCUMENTS

| | | |
|---|---|---|
| CN | 107923853 A | 4/2018 |
| JP | S50-014333 B1 | 5/1975 |
| JP | S61-003043 A | 1/1986 |
| JP | H04-106470 A | 4/1992 |
| JP | H11-304707 A | 11/1999 |
| JP | 2001-296624 A | 10/2001 |
| JP | 2008-541139 A | 11/2008 |
| JP | 2009-198210 A | 9/2009 |
| JP | 2010-518394 A | 5/2010 |
| JP | 2011-529577 A | 12/2011 |
| JP | 2013-127393 A | 6/2013 |
| JP | 2015-197606 A | 11/2015 |
| JP | 6703215 B1 | 6/2020 |
| WO | WO-2006/119277 A2 | 11/2006 |
| WO | WO-2008/097199 A1 | 8/2008 |
| WO | WO-2010/014505 A1 | 2/2010 |

OTHER PUBLICATIONS

Marta Valledor et al., "Determination of phosphorescence lifetimes in the presence of high background signals using phase-shift measurements", Sensors and Actuators B: Chemical, Elsevier BV, NL, vol. 133, No. 1, Jan. 17, 2006, p. 249-p. 258, XP002664928.

International Preliminary Report on Patentability mailed May 6, 2021 for PCT/JP2019/041779.

Takeuchi, Nobuo, "Lock-in Amplifier and Its Application," Journal of The Society of Instrument and Control Engineers, Jul. 1970, vol. 9, No. 7, pp. 511-518.

* cited by examiner

Fig.11
(a) POSITIONAL RELATIONSHIP IN INITIAL STATE OF EACH SIGNAL
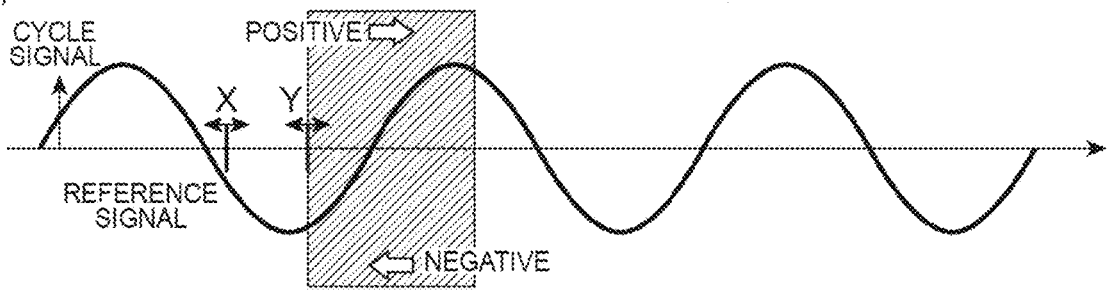
(b) PERFORM INTEGRATION, AND SHIFT TO RIGHT DUE TO POSITIVE VALUE (DIRECTION OF PHASE DELAY)
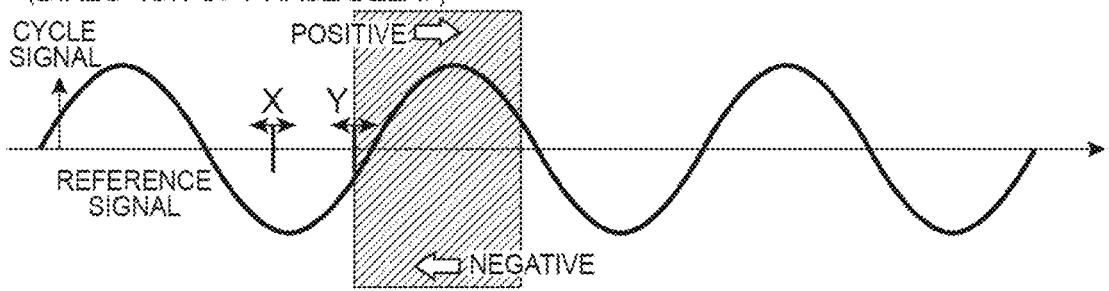
(c) PERFORM INTEGRATION, AND SHIFT TO RIGHT DUE TO POSITIVE VALUE (DIRECTION OF PHASE DELAY)
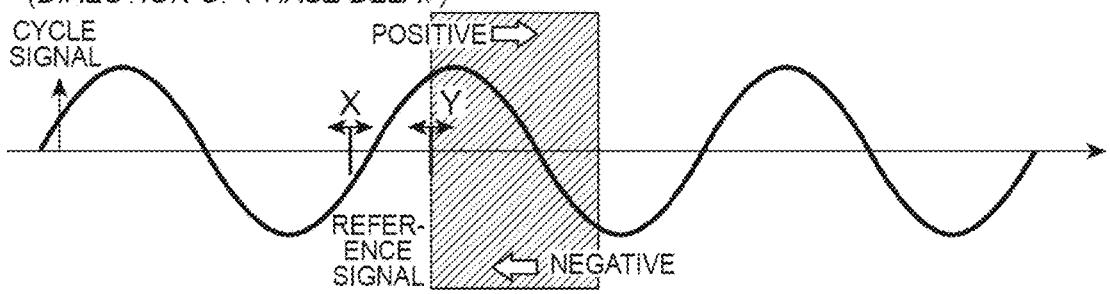
(d) PERFORM INTEGRATION, AND SHIFT TO LEFT DUE TO NEGATIVE VALUE (DIRECTION OF PHASE DELAY)
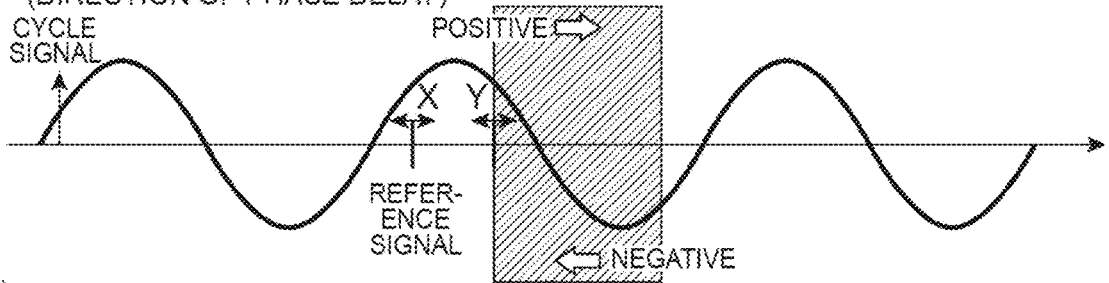
(e) COMPLETION OF CALIBRATION
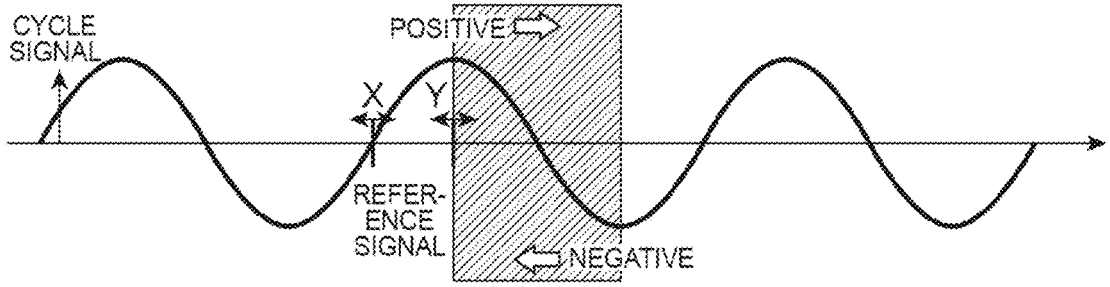

Fig.12

| MODULATION FREQUENCY[Hz] | 100 | 500 | 1000 |
|---|---|---|---|
| FLUORESCENCE(Peak to Peak) [mV] | 640 | 270 | 140 |
| EXCITATION LIGHT(Peak to Peak) [mV] | 33 | 27 | 22 |
| FLUORESCENCE/EXCITATION LIGHT | 19 | 10 | 6 |

Fig.16
(a)
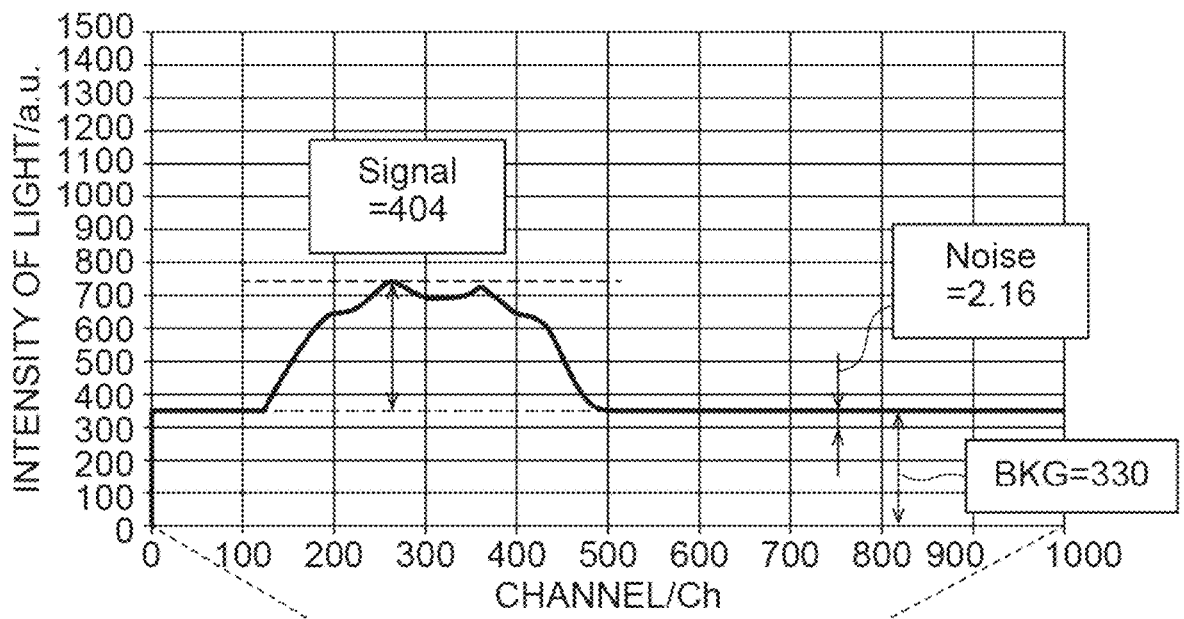
(b)
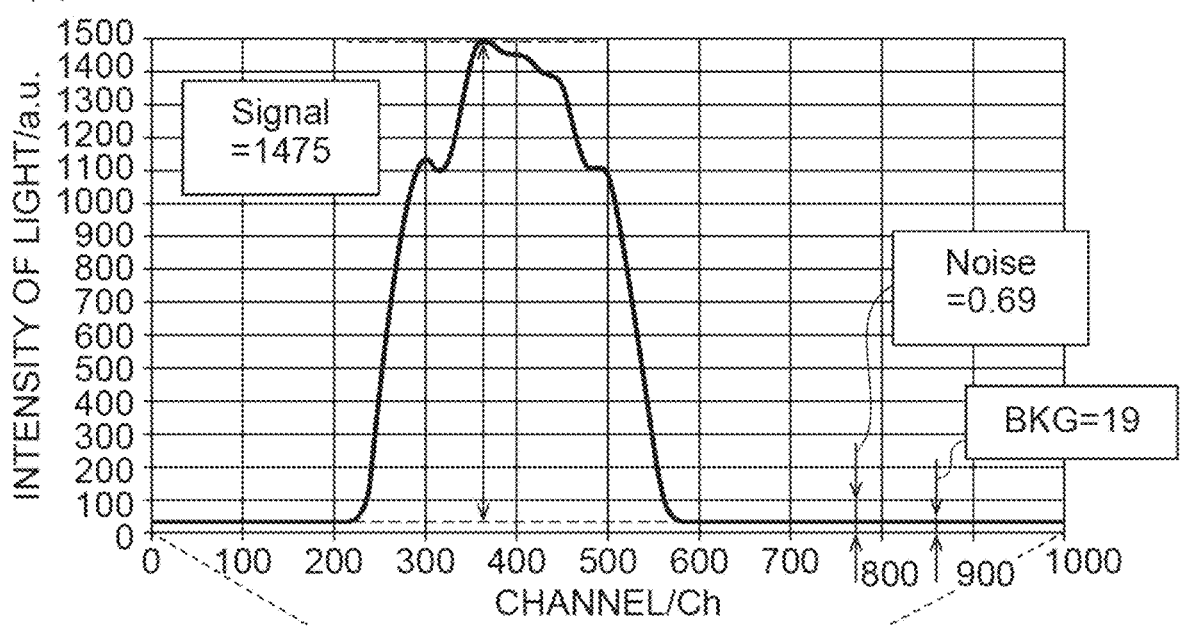

OPTICAL MEASUREMENT DEVICE AND OPTICAL MEASUREMENT METHOD

TECHNICAL FIELD

An aspect of the present invention relates to an optical measurement device and an optical measurement method for measuring optical characteristics of a sample.

BACKGROUND ART

Patent Literature 1 discloses a technology for generating and deducting an attenuation signal in order to remove a fluorescence noise component (a fluorescent component from a substrate) included when a fluorescence sample placed on a substrate is irradiated with excitation light and fluorescence is measured. Specifically, in Patent Literature 1, a fluorescence noise component is removed by generating an attenuation signal having a phase equivalent to that of the fluorescence on the substrate and deducting the attenuation signal from a measured fluorescent signal.

CITATION LIST

Patent Literature

[Patent Literature 1] Japanese Unexamined Patent Publication No. 2010-518394

SUMMARY OF INVENTION

Technical Problem

As described above, in Patent Literature 1, a fluorescence noise component generated from parts other than a measurement target portion of a sample is removed from fluorescence generated when the sample is irradiated with excitation light. Here, regarding a noise component included when a sample is irradiated with light and light from the sample is detected, it is assumed that not only light caused by light (for example, fluorescence) generated from the sample (which has been irradiated) but also light (for example, scattered light) caused by irradiation light (for example, excitation light) itself becomes a noise component. In the technology of Patent Literature 1, a case in which irradiation light itself has become a noise component is not taken into consideration, and thus the noise component cannot be removed.

An aspect of the present invention has been made in consideration of the foregoing circumstances, and an object thereof is to provide an optical measurement device and an optical measurement method capable of removing a noise component caused by irradiation light itself.

Solution to Problem

According to an aspect of the present invention, there is provided an optical measurement device including a light detection unit configured to detect detection light including second light generated from a sample irradiated with first light and third light caused by the first light and having a phase equivalent to a phase of the first light, and a signal processing unit configured to perform processing of a detection signal corresponding to the detection light. The signal processing unit removes a signal component corresponding to the third light from the detection signal on the basis of a phase difference between the second light and the third light.

In the optical measurement device according to the aspect of the present invention, a signal component corresponding to the third light is removed from the detection signal on the basis of a phase difference between the second light generated from the sample irradiated with the first light and the third light caused by the first light and having a phase equivalent to that of the first light. That is, focusing on the fact that the third light corresponding to a noise component of light components included in the detection light is light caused by the first light and has a phase equivalent to that of the first light, a signal component which is a noise component caused by the first light itself and corresponds to the third light can be removed by removing a signal component having a phase equivalent to that of the first light from the detection signal. Specifically, since the detection light may include not only light (second light) generated from the sample but also light (third light) caused by irradiation light (first light) as noise components, the second light is detected with a slight delay with respect to the third light (the second light has a phase difference with respect to the third light). Therefore, only a signal component corresponding to the third light can be appropriately removed from the detection signal by utilizing the phase difference. As above, according to the optical measurement device of the aspect of the present invention, a noise component caused by the irradiation light (first light) itself can be appropriately removed.

The signal processing unit described above may remove a signal component corresponding to the third light from the detection signal by dividing the detection signal in units of predetermined times corresponding to the phase of the third light, individually amplifying each component of the divided detection signal, and synthesizing each of the amplified components. In this manner, in consideration of the phase of the third light, a signal component corresponding to the third light can be appropriately removed by dividing the detection signal (division in units of predetermined times), amplifying each of the divided components, and synthesizing each of the amplified components such that only a signal component corresponding to the third light is removed. Further, since the second light has a phase difference with respect to the third light, even if signal processing for removing only a signal component corresponding to the third light is performed, a signal component corresponding to the second light is not removed and only a signal component corresponding to the second light can be appropriately taken out from the detection signal.

The first light described above may be excitation light for exciting the sample. The second light may be fluorescence emitted by the sample in response to the excitation light. The third light may include at least one of the excitation light and scattered light of the excitation light. Accordingly, a signal component corresponding to at least one of the excitation light and the scattered light of the excitation light can be appropriately removed and only a signal component corresponding to the fluorescence can be appropriately taken out from the detection signal including signal components corresponding to the fluorescence and at least one of the excitation light and the scattered light of the excitation light.

The light detection unit may detect calibration processing light not including the second light and including the third light. The signal processing unit may perform calibration processing for removing a signal component corresponding to the third light from the detection signal on the basis of a calibration signal corresponding to the calibration processing light and remove a signal component corresponding to the third light from the detection signal in consideration of a result of the performed calibration processing. A signal component corresponding to the third light can be appropriately removed from the detection signal by performing calibration processing for removing a signal component corresponding to the third light from the detection signal in advance on the basis of the calibration processing light including the third light.

The optical measurement device described above may further include a light source driving circuit configured to set a modulation frequency of a light source outputting the first light. The signal processing unit may generate a lock-in switch signal having a phase shifted with respect to a cycle signal marking a cycle by an operation frequency of the signal processing unit according to the modulation frequency of the light source set by the light source driving circuit, output a signal component corresponding to the third light when the calibration signal and the switch signal are input, and adjust the phase of the switch signal such that a voltage value of a signal component corresponding to the third light is within a predetermined range approximating zero in the calibration processing; and remove a signal component corresponding to the third light from the detection signal when the detection signal and the switch signal having the phase adjusted in the calibration processing are input. In this manner, when the phase of the switch signal is adjusted using a lock-in circuit such that the voltage value of a signal component corresponding to the third light becomes a value approximating zero in the calibration processing, a signal component corresponding to the third light can be appropriately removed from the detection signal when the switch signal after phase adjustment is input.

The signal processing unit may adjust the phase of the switch signal such that the phase is delayed when the voltage value of a signal component corresponding to the third light is not within the predetermined range but is larger than a value within the predetermined range and adjust the phase of the switch signal such that the phase advances when the voltage value of a signal component corresponding to the third light is not within the predetermined range but is smaller than a value within the predetermined range in the calibration processing. Accordingly, the voltage value of a signal component corresponding to the third light can be appropriately adjusted to a value close to zero in the calibration processing.

The light source driving circuit may set the modulation frequency of the light source to be lower than a value corresponding to a fluorescence lifetime indicating a period of time taken until an intensity of the second light drops from a peak value to 1/e. When the modulation frequency is raised to a value approximately corresponding to the fluorescence lifetime, consecutive signals may overlap each other, and thus the intensity of the fluorescence cannot be maximized. In this regard, since the modulation frequency is set to be lower than a value corresponding to the fluorescence lifetime, the intensity of the fluorescence can be appropriately enhanced.

The light source driving circuit may set the modulation frequency of the light source to be lower than a value corresponding to the fluorescence lifetime and higher than a commercial frequency. Accordingly, the modulation frequency becomes higher than a value corresponding to the fluorescence lifetime, and thus increase in noise can be avoided while avoiding decrease in intensity of the fluorescence.

The signal processing unit may generate, as the lock-in switch signals, a first signal, a second signal having a phase shifted with respect to the first signal by 90 degrees, a third signal realized by inverting the first signal, and a fourth signal realized by inverting the second signal using independently dedicated circuits. Since inverted signals are generated using independently dedicated circuits, it is possible to prevent occurrence of a minute delay which may become a problem when inverted signals are generated, for example, using a NOT circuit (a minute delay caused when passing through a NOT circuit).

The signal processing unit may be set by switching between the operation frequencies of two kinds at a predetermined proportion. Accordingly, compared to a case of having an operation frequency of one kind, the operation frequency of the signal processing unit is more likely to match with the modulation frequency of the light source, and thus synchronization accuracy thereof can be improved.

According to another aspect of the present invention, there is provided an optical measurement method including irradiating a sample with first light, detecting detection light including second light generated from the sample irradiated with the first light and third light caused by the first light and having a phase equivalent to a phase of the first light, and removing a signal component corresponding to the third light from a detection signal corresponding to the detection light on the basis of a phase difference between the second light and the third light. According to the optical measurement method of the aspect of the present invention, a noise component caused by the irradiation light (first light) itself can be appropriately removed.

The foregoing optical measurement method may further include detecting calibration processing light not including the second light and including the third light, and performing calibration processing for removing a signal component corresponding to the third light from the detection signal on the basis of a calibration signal corresponding to the calibration processing light and removing a signal component corresponding to the third light from the detection signal in consideration of a result of the performed calibration processing.

The optical measurement method may further include generating a lock-in switch signal having a phase shifted with respect to a cycle signal marking a cycle in accordance with a modulation frequency of a light source, outputting a signal component corresponding to the third light when the calibration signal and the switch signal are input, and adjusting the phase of the switch signal such that a voltage value of a signal component corresponding to the third light is within a predetermined range approximating zero in the calibration processing; and removing a signal component corresponding to the third light from the detection signal when the detection signal and the switch signal having the phase adjusted in the calibration processing are input.

In the calibration processing, the phase of the switch signal may be adjusted such that the phase is delayed when the voltage value of a signal component corresponding to the third light is not within the predetermined range but is larger than a value within the predetermined range, and the phase of the switch signal may be adjusted such that the phase advances when the voltage value of a signal component corresponding to the third light is not within the predetermined range but is smaller than a value within the predetermined range.

In the sample, a dripping portion for dripping a specimen, a holding portion for holding a detection antibody labeled with a fluorescent reagent, and a measurement portion for fixing a capturing antibody may be disposed toward a downstream side from an upstream side. The calibration processing light may be detected by irradiating an area on the downstream side of the capturing antibody in the sample with the first light. Since a fluorescent component is likely to stay on the upstream side of the capturing antibody, the calibration processing light in which an influence of the fluorescent component is reduced can be appropriately detected by irradiating the area on the downstream side of the capturing antibody with the first light and detecting the calibration processing light.

Advantageous Effects of Invention

According to the aspect of the present invention, it is possible to remove a noise component caused by irradiation light itself.

BRIEF DESCRIPTION OF DRAWINGS

FIG. 11 is a view for describing calibration processing.

FIG. 12 is a table showing proportions of fluorescent components in each modulation frequency.

FIG. 16 is a view for describing an effect of calibration processing.

DESCRIPTION OF EMBODIMENT

Hereinafter, an embodiment of the present invention will be described in detail with reference to the drawings. In each diagram, the same reference signs are applied to parts which are the same or corresponding, and duplicate description will be omitted.

Figure 1:
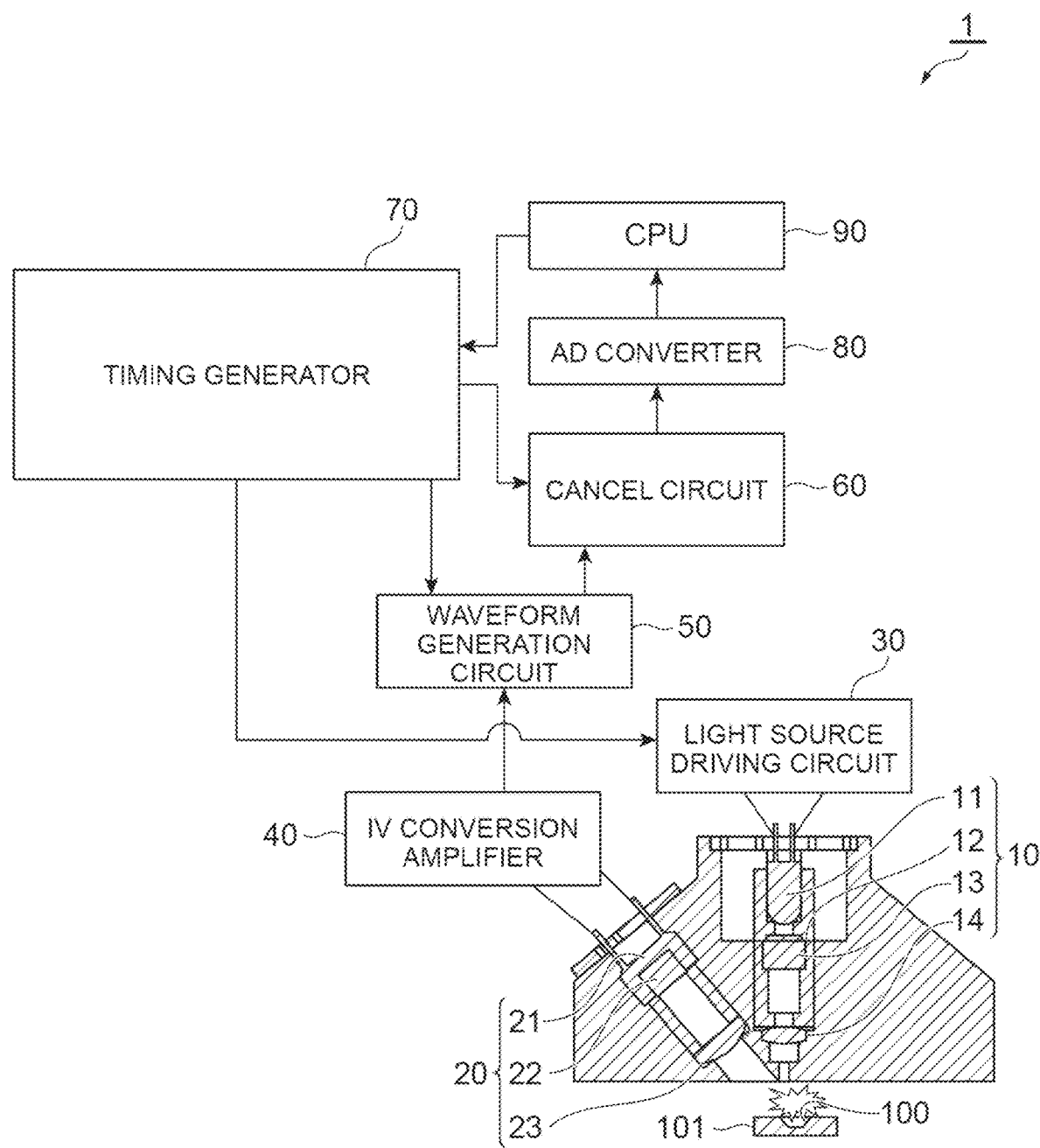
FIG. 1 is a view of a schematic configuration of an optical measurement device according to an embodiment of the present invention.

FIG. 1 is a view of a schematic configuration of an optical measurement device 1 according to the present embodiment. The optical measurement device 1 is a device for detecting light generated from a sample in response to light with which the sample is irradiated. In the present embodiment, description will be given such that the optical measurement device 1 is a fluorescence measurement device for detecting fluorescence generated from a sample in response to excitation light with which the sample is irradiated. Excitation light is light for exciting a sample, and fluorescence is light emitted by a sample in response to excitation light and is light having a wavelength different from that of the excitation light. In addition, in the present embodiment, description will be given such that the optical measurement device 1 is a device for detecting fluorescence related to measurement using an immuno-chromatography method. An immuno-chromatography method is an immunity measurement method utilizing antigen-antibody reaction. For example, it is used for detecting an influenza virus or the like.

As illustrated in FIG. 1, in measurement using an immuno-chromatography method, an immuno-chromatography test piece 100 is prepared as a sample. The immuno-chromatography test piece 100 accommodates an immuno-chromatographic membrane serving as a measurement target inside a reagent holder 101. A capturing antibody with respect to a predetermined antigen (for example, an antibody with respect to an influenza virus antigen) is fixed at a particular position (measurement target portion) in the immuno-chromatographic membrane of the immuno-chromatography test piece 100. The reagent holder 101 is provided with a specimen spot application window which is an opening portion for dripping a specimen in the immuno-chromatographic membrane, and a measurement window which is an opening portion for measuring the measurement target portion to which the capturing antibody is fixed. When the specimen is dripped into the specimen spot application window of the reagent holder 101, an antigen in the specimen is first combined with a detection antibody labeled with a fluorescent reagent, subsequently causes antigen-antibody reaction to the capturing antibody, and is trapped. The optical measurement device 1 measures an intensity of fluorescence by irradiating the immuno-chromatographic membrane exposed through the measurement window of the immuno-chromatography test piece 100 with excitation light and detecting fluorescence from an antigen-antibody complex (specifically, a fluorescent reagent of an antibody) in the measurement target portion. Regarding a fluorescent reagent, for example, europium, Q-dot (registered trademark), an organic dye, or the like can be used.

Here, it is assumed that detection light which is incident on and detected by a detection optical system 20 (which will be described below) in the optical measurement device 1 includes not only fluorescence but also light caused by excitation light itself. Examples of such light include scattered light of excitation light. For example, such scattered light is a part of excitation light generated when the immuno-chromatography test piece 100 is irradiated with excitation light and the excitation light scatters, and the scattered light is light having a phase equivalent to that of the excitation light (there is no phase difference therebetween). Since the immuno-chromatographic membrane of the immuno-chromatography test piece 100 and the reagent holder 101 are generally white, the scattered light described above is likely to be generated. In addition, excitation light itself may be detected depending on a way of disposing a sample to be measured or a detection optical system. Hereinafter, description will be given such that detection light detected in the optical measurement device 1 includes fluorescence and scattered light.

As illustrated in FIG. 1, the optical measurement device 1 includes an irradiation optical system 10 (light source unit), the detection optical system 20 (light detection unit), a light source driving circuit 30, an IV conversion amplifier 40, a waveform generation circuit 50, a cancel circuit 60 (signal processing unit), a timing generator 70, an AD converter 80, and a CPU 90.

The irradiation optical system 10 irradiates the immuno-chromatography test piece 100 with excitation light. The irradiation optical system 10 has a light source 11, an aperture 12, an excitation light filter 13, and a collimating lens 14. The light source 11 irradiates the immuno-chromatography test piece 100 (sample) with excitation light (first light). For example, the light source 11 is a semiconductor light emitting element. In the present embodiment, description will be given such that the light source 11 is a light emitting diode (LED), but the embodiment is not limited thereto. For example, an LD may be used in order to ensure the quantity of light. The aperture 12 is a luminous flux shaping member for shaping light emitted from the light source 11 into light having a desired luminous flux cross section. The excitation light filter 13 is a wavelength selection filter for filtering a wavelength necessary for excitation regarding excitation light which has arrived through the aperture 12. For example, the excitation light filter 13 is an optical filter such as a dielectric multi-layer film filter or a color glass filter. More specifically, the excitation light filter 13 is a band-pass filter constituted of a dielectric multi-layer film filter allowing only a particular wavelength range (an excitation wavelength of a fluorescent reagent) to be transmitted therethrough. The collimating lens 14 is a lens for forming an image of excitation light after being filtered by the excitation light filter 13 on the immuno-chromatography test piece 100 (specifically, the measurement target portion of the immuno-chromatographic membrane).

The detection optical system 20 detects fluorescence from the immuno-chromatography test piece 100. However, in fact, in addition to fluorescence from the immuno-chromatography test piece 100 (fluorescence from the measurement target portion of the immuno-chromatographic membrane), detection light which is light including scattered light caused by excitation light itself described above is incident on the detection optical system 20, so that the detection light is detected. The detection optical system 20 has a light detection element 21, a fluorescence filter 22, and a condensing lens 23. Detection light is condensed by the condensing lens 23 and is incident on the light detection element 21 through the fluorescence filter 22. The fluorescence filter 22 is a wavelength selection filter provided to curve arrival of light other than fluorescence at the light detection element 21 regarding detection light from the immuno-chromatography test piece 100. For example, the fluorescence filter 22 is an optical filter such as a dielectric multi-layer film filter or a color glass filter. More specifically, the fluorescence filter 22 is a band-pass filter in which a dielectric multi-layer film filter and a color glass filter are combined such that only a particular wavelength range is allowed to be transmitted therethrough. However, for example, when an excitation light wavelength and a fluorescence wavelength are close to each other or the like, it is difficult to efficiently block only scattered light having an excitation light wavelength using the fluorescence filter 22 while allowing fluorescence having a fluorescence wavelength to be appropriately transmitted therethrough. In addition, generally, characteristics of a dielectric multi-layer film filter which is widely used as an efficient wavelength selection filter change depending on an incident angle of light. For this reason, in the present embodiment, the fluorescence filter 22 is constituted of a combination of a dielectric multi-layer film filter and a color glass filter, and thus scattered light in an oblique direction is effectively blocked by the color glass filter. However, after all, it is difficult to achieve a sufficient effect by simply selecting a wavelength and it is difficult to efficiently prevent entry of scattered light having various conditions. Hereinafter, description will be given such that detection light which arrives at the light detection element 21 includes scattered light even if the fluorescence filter 22 is provided.

The light detection element 21 is an optical sensor for detecting detection light after being filtered by the fluorescence filter 22. For example, the light detection element 21 is a semiconductor light receiving element. In the present embodiment, description will be given such that the light detection element 21 is a photodiode (PD), but the embodiment is not limited thereto. An avalanche photodiode (APD), a photomultiplier tube (PMT), or the like may be adopted as long as it can respond fast in response to a modulation frequency of excitation light from the light source 11, which will be described below. Specifically, the light detection element 21 detects detection light including fluorescence (second light) generated from the immuno-chromatography test piece 100 irradiated with excitation light (specifically, a fluorescent reagent of an antigen-antibody complex in the measurement target portion of the immuno-chromatographic membrane) and the foregoing scattered light (third light) which is light caused by the excitation light and has no phase difference with respect to the excitation light. The light detection element 21 outputs a detection signal corresponding to the detection light to the IV conversion amplifier 40.

The light source driving circuit 30 is a circuit for driving the light source 11 by outputting a drive current to the light source 11 (LED). The light source driving circuit 30 receives an input of a frequency signal having a sine wave shape (reference) from the timing generator 70. The light source driving circuit 30 modulates the frequency of the drive current on the basis of the input frequency signal (reference). That is, the light source driving circuit 30 sets the modulation frequency of the light source 11 outputting excitation light. In response to this, the frequency of excitation light output from the light source 11 is modulated, and the quantity of light (the quantity of excitation light) from the light source 11 changes into a sine wave shape. The modulation frequency may be determined on the basis of a fluorescence lifetime of a fluorescent reagent to be used. For example, when europium having a fluorescence lifetime of several milliseconds is used as a fluorescent reagent, the modulation frequency may be set to approximately 1 kHz. When Q-dot having a fluorescence lifetime of several tens of nanoseconds is used, the modulation frequency may be set to approximately 1 MHz. When an organic dye having a fluorescence lifetime within a range of several nanoseconds to several tens of nanoseconds is used, the modulation frequency may be set to approximately 10 MHz.

Generally, a fluorescence lifetime indicates a period of time taken until an intensity of fluorescence drops from a peak value to 1/e (approximately 37%). If a reverse operation is performed from this definition of a fluorescence lifetime, it is preferably assumed that an optimum modulation frequency when using europium having a fluorescence lifetime of several milliseconds is 1 kHz and an optimum modulation frequency when using an organic dye having a fluorescence lifetime within a range of several nanoseconds to several tens of nanoseconds is within a range of approximately 100 MHz to 1 GHz, for example. However, as a result of actually measuring a signal output derived from fluorescence with respect to the modulation frequency using a europium reagent, it has become clear that the intensity of fluorescence is enhanced and a proportion of a fluorescent signal with respect to excitation light also increases when modulation is performed at a frequency lower than a frequency determined from the fluorescence lifetime (refer to FIG. 12). As illustrated in FIG. 12, the intensity of fluorescence is enhanced on a side of frequencies lower than 1 kHz which is a frequency determined from the fluorescence lifetime. Specifically, the intensity of fluorescence can be enhanced by defining the fluorescence lifetime as "a period of time taken until the peak value of the intensity of fluorescence drops to 1%" instead of 1/e, and obtaining the modulation frequency from the period of time. In this case, if europium is used, the fluorescence lifetime becomes approximately 10 ins, and the modulation frequency of the light source 11 determined from this becomes approximately 100 Hz.

As described above, the light source driving circuit 30 may determine the modulation frequency of the light source 11 in consideration of the intensity of fluorescence. Specifically, the light source driving circuit 30 sets the modulation frequency of the light source 11 to be lower than a value corresponding to the fluorescence lifetime (specifically, 1/fluorescence lifetime) which is a period of time taken until the intensity of fluorescence drops from the peak value to 1/e. The light source driving circuit 30 sets the modulation frequency of the light source 11 to be lower than a value corresponding to the fluorescence lifetime and higher than a commercial frequency (50 Hz or 60 Hz). For example, the modulation frequency thereof is set to approximately 110 Hz which is near 100 Hz and at which an influence of noise is reduced by avoiding double waves of the commercial frequency. The light source driving circuit 30 may set the modulation frequency of the light source 11 to other values near 100 Hz, such as 90 Hz, 80 Hz, 70 Hz, or 130 Hz, for example.

The IV conversion amplifier 40 converts a current signal (detection signal) output from the light detection element 21 into a voltage signal. The IV conversion amplifier 40 outputs a detection signal converted into a voltage signal to the waveform generation circuit 50.

The waveform generation circuit 50 is a circuit for generating a waveform of a detection signal on the basis of the detection signal output from the IV conversion amplifier 40. The waveform generation circuit 50 receives an input of a frequency signal (reference) from the timing generator 70. The timing generator 70 inputs a frequency signal, which becomes a reference at the same timing, to the light source driving circuit 30 and the waveform generation circuit 50. The waveform generation circuit 50 outputs information of the generated waveform (detection signal) to the cancel circuit 60.

The cancel circuit 60 is a signal processing unit for processing the waveform (detection signal) generated by the waveform generation circuit 50. The cancel circuit 60 removes a signal component corresponding to scattered light from a detection signal on the basis of a difference between phases (phase difference) of fluorescence and scattered light. The cancel circuit 60 acquires information of the phase of excitation light (that is, scattered light) at the same timing in the light source driving circuit 30 and the waveform generation circuit 50 by receiving an input of a frequency signal (reference) from the timing generator 70. Accordingly, a signal component of scattered light can be removed in the cancel circuit 60 based on the phase difference between fluorescence and scattered light. Details of processing of the cancel circuit 60 will be described with reference to FIGS. 2 to 4.

Figure 2:
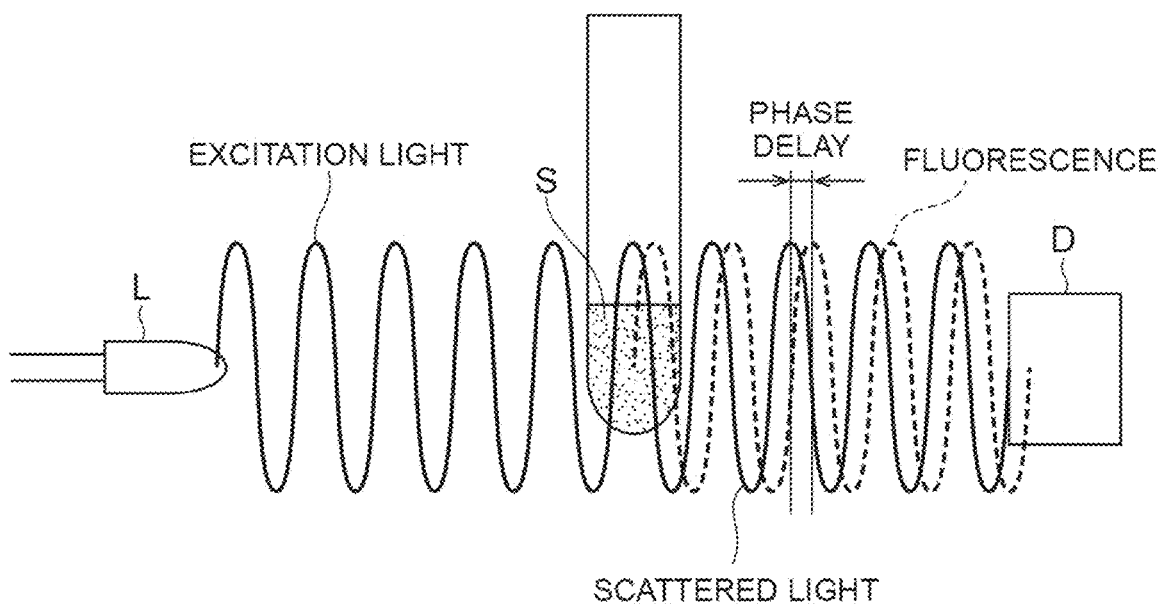
FIG. 2 is a view for describing a phase difference between fluorescence and scattered light.

FIG. 2 is a conceptual diagram for describing a phase difference between fluorescence and scattered light. As illustrated in FIG. 2, sine wave-shaped detection light from a sample S irradiated with sine wave-shaped excitation light from a light source unit L (detection light detected by a light detection unit D) includes scattered light and fluorescence having sine wave shapes. The shape of excitation light from the light source unit L is not limited to a sine wave shape, and a cyclic modulation waveform such as a rectangular wave may be adopted. In this case, detection light (scattered light and fluorescence) also has a cyclic modulation waveform similar to that of excitation light. Further, scattered light is light having no phase difference with respect to excitation light, whereas fluorescence is light which is generated from the sample S in response to excitation light and of which the phase is detected with a delay within a range of approximately several tens of milliseconds to nanoseconds with respect to scattered light. The inventors have focused on such a phase difference and have found a technique for removing only scattered light from detection light and taking out only fluorescence. In FIG. 2, the sample S and the light detection unit D are disposed on an optical axis of the light source unit L. Therefore, in a manner different from FIG. 1 detecting fluorescence emitted in a direction orthogonal to an optical axis of excitation light, fluorescence emitted in a direction coaxial with the optical axis of excitation light is detected. In such a case, in addition to fluorescence and scattered light included in detection light, there is also a possibility that excitation light itself is included. In addition, there is a high possibility that the quantity of light which is incident on the light detection unit D and caused by the excitation light also increases. For this reason, fluorescence can be effectively taken out by this technique.

Figure 3:
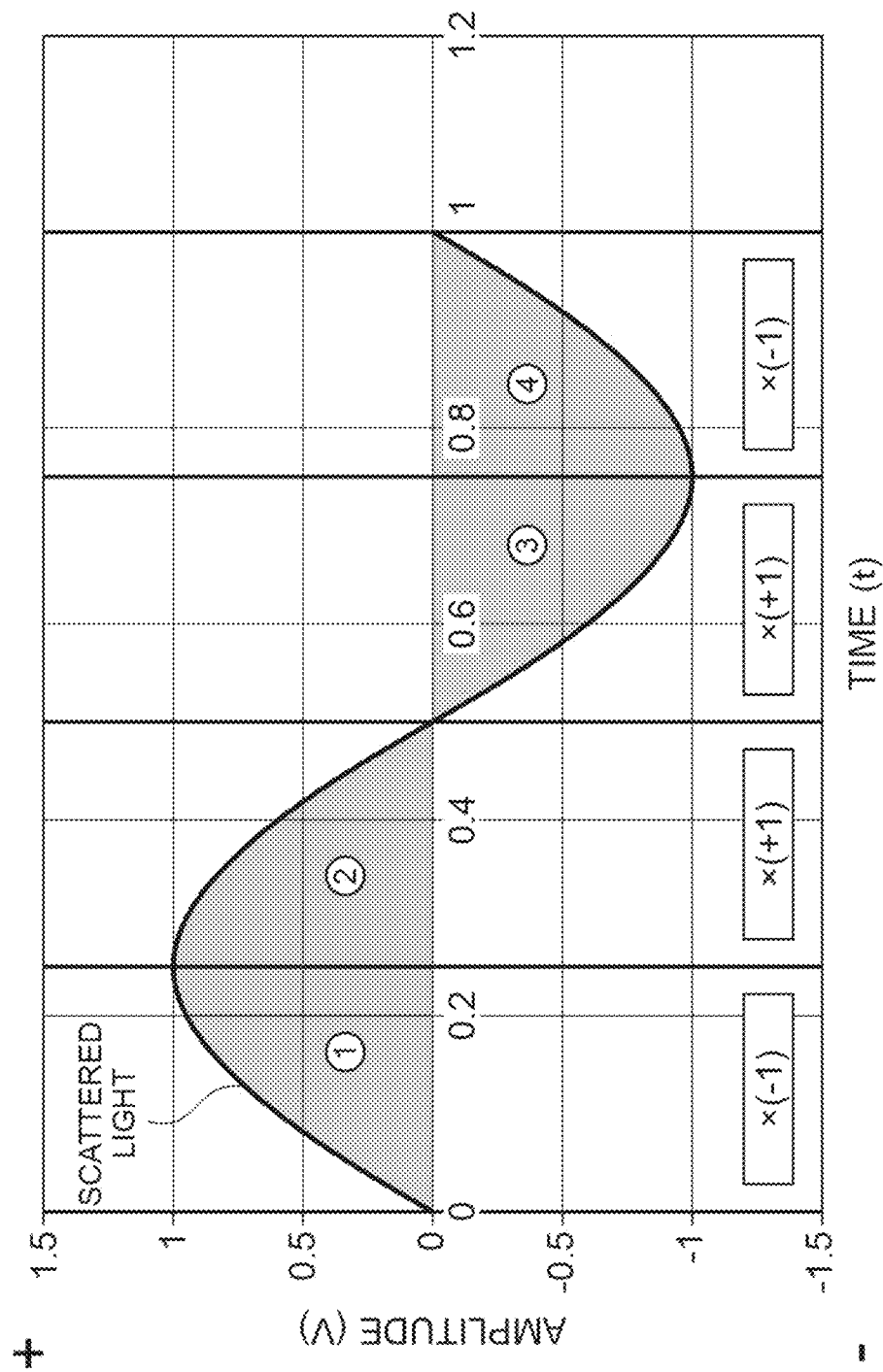
FIG. 3 is a view for describing a method for canceling scattered light.

FIG. 3 is a view for describing a technique for removing (canceling) scattered light. FIG. 3 illustrates only the waveform of scattered light of detection light. This waveform is equivalent to the waveform of excitation light. In FIG. 3, the horizontal axis indicates time, and the vertical axis indicates amplitude. When the waveform corresponding to the phase of scattered light illustrated in FIG. 3 is divided in units of times of ¼ of one cycle (divided into time regions), for example, and when each of the time regions 1 to 4 is integrated, an output of scattered light in each of the time regions 1 to 4 can be obtained. Here, when each of integrated values of the time regions 1 to 4 is multiplied by a certain multiplier and all of the multiplied values are added together, the sum of outputs thereof can become zero. That is, the absolute values for the outputs of the time regions 1 to 4 are the same as each other, the range of the amplitudes of the time regions 1 and 2 indicates a positive value, and the range of the amplitudes of the time regions 3 and 4 indicates a negative value. Therefore, as illustrated in FIG. 3, when the time region 1 is amplified by being multiplied by the multiplier "−1", an output of the time region 1 becomes a negative value due to "positive value×negative value". When the time region 2 is amplified by being multiplied by the multiplier "+1", an output of the time region 2 becomes a positive value due to "positive value×positive value". When the time region 3 is amplified by being multiplied by the multiplier "+1", an output of the time region 3 becomes a negative value due to "negative value× positive value". When the time region 4 is amplified by being multiplied by the multiplier "−1", an output of the time region 4 becomes a positive value due to "negative value×negative value". For this reason, when all the integrated values of the time regions 1 to 4 amplified by being multiplied by a predetermined multiplier are added together, the values are offset with each other, and thus the sum of the outputs becomes zero. In this manner, a signal component corresponding to scattered light can be removed (outputs become zero) by performing dividing in units of predetermined times corresponding to the phase of scattered light, individually amplifying each of the divided components, and synthesizing each of the amplified components.

Figure 4:
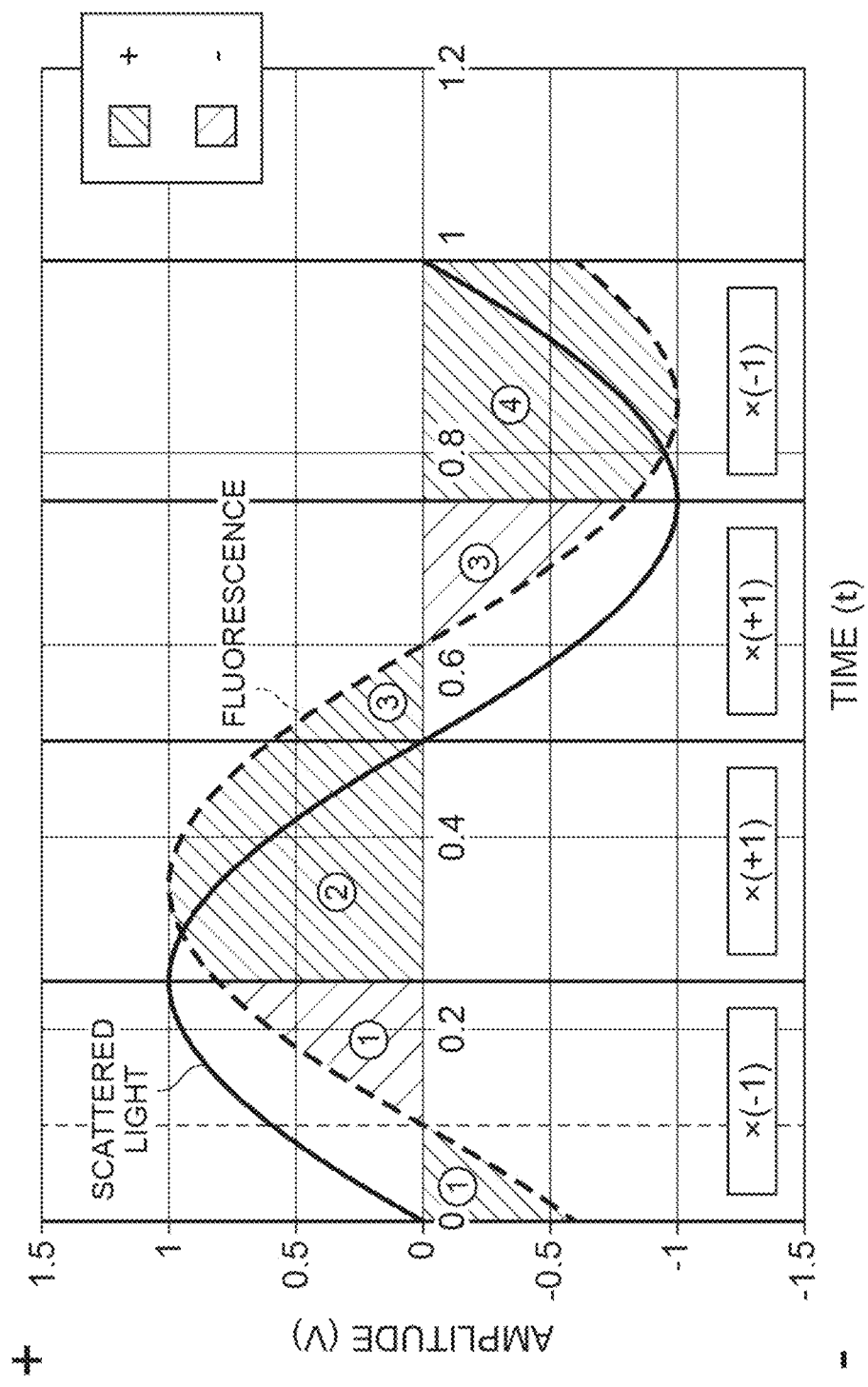
FIG. 4 is a view for describing a method for measuring fluorescence.

FIG. 4 is a view for describing a method for measuring fluorescence. FIG. 4 illustrates waveforms of scattered light and fluorescence included in a detection signal. In FIG. 4, the horizontal axis indicates time, and the vertical axis indicates amplitude. As described above, a signal component corresponding to scattered light can be removed (outputs become zero) by performing dividing in units of predetermined times corresponding to the phase of scattered light, individually amplifying each of the divided components, and synthesizing each of the amplified components. Here, as illustrated in FIG. 4, since fluorescence has a phase difference with respect to scattered light, when dividing is performed in units of predetermined times corresponding to the phase of scattered light, the integrated values of the time regions 1 to 4 do not become the same as each other. Therefore, a value other than zero is output as a value obtained through multiplication by a multiplier similar to that of scattered light and by individually performing amplification and adding. In this manner, the output intensity of fluorescence can be wave-detected and output while removing a signal component of scattered light by dividing scattered light and fluorescence into the same time regions and performing amplification and synthesizing.

In this manner, the cancel circuit 60 can remove a signal component corresponding to scattered light from a detection signal and can obtain a signal component of fluorescence by dividing the detection signal in units of predetermined times corresponding to the phase of scattered light, individually amplifying each component of the divided detection signal, and synthesizing each of the amplified components. The cancel circuit 60 outputs a fluorescent signal that is a signal from which a signal component corresponding to scattered light is removed (that is, a signal having only a signal component of fluorescence) to the AD converter 80. For example, times of ¼ of one cycle are taken as units of predetermined times, but the unit is not limited thereto. Any units of times may be adopted as long as they are units of times in which a signal component corresponding to scattered light can be removed after synthesizing. In addition, for example, "+1" and "−1" are taken as multipliers in amplification, but the multiplier is not limited thereto. Any multiplier may be adopted as long as it is a multiplier with which a signal component corresponding to scattered light can be removed after synthesizing.

The AD converter 80 performs AD conversion for a fluorescent signal output from the cancel circuit 60, converts the output thereof into a digital value, and outputs the digital value to the CPU 90. The CPU 90 performs predetermined control/signal processing for a digital signal (fluorescent signal) output from the AD converter 80. The CPU 90 may transfer results of the signal processing to an external computer through serial communication, for example. In addition, the CPU 90 may generate signals output from the timing generator 70, that is, signals for determining various operation timings in the optical measurement device 1 and output the signals to the timing generator 70. An FPGA may be used in place of the CPU 90. Through the foregoing processing, the optical measurement device 1 can remove an influence of scattered light from detection light and can obtain only a signal related to fluorescence of a fluorescent reagent.

Next, fluorescence measurement processing (optical measurement method) performed by the optical measurement device 1 will be described with reference to FIG. 5.

Figure 5:
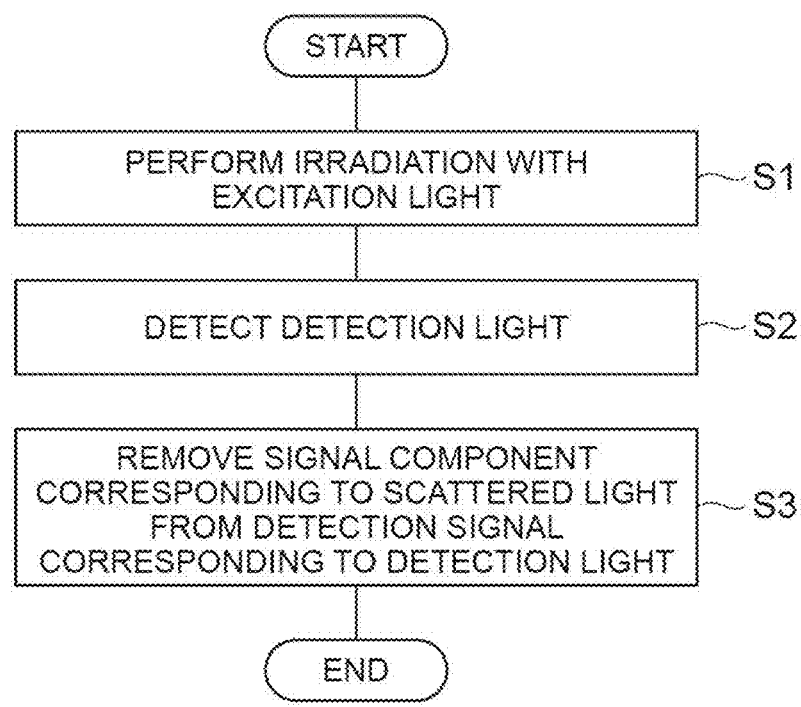
FIG. 5 is a flowchart illustrating fluorescence measurement processing performed by the optical measurement device.

FIG. 5 is a flowchart illustrating fluorescence measurement processing performed by the optical measurement device 1. As illustrated in FIG. 5, in fluorescence measurement processing, first, the light source 11 of the irradiation optical system 10 (light source unit) irradiates the immuno-chromatography test piece 100 (sample) with excitation light (Step S1). When the immuno-chromatography test piece 100 (specifically, an antigen-antibody complex in the measurement target portion of the immuno-chromatographic membrane) is irradiated with excitation light, fluorescence is emitted from a fluorescent reagent of an antigen-antibody complex. Meanwhile, excitation light scatters in the immuno-chromatography test piece 100, and thus scattered light is generated.

Subsequently, the light detection element 21 of the detection optical system 20 (light detection unit) detects detection light including the fluorescence and the scattered light described above (Step S2). The light detection element 21 outputs detection light to the IV conversion amplifier 40. Further, a current signal (detection signal) output from the light detection element 21 in the IV conversion amplifier 40 is converted into a voltage signal. After a waveform of a detection signal is generated in the waveform generation circuit 50, the cancel circuit 60 (signal processing unit) removes a signal component corresponding to the scattered light from the detection signal on the basis of the phase difference between the fluorescence and the scattered light (Step S3). Specifically, the cancel circuit 60 removes a signal component corresponding to the scattered light from the detection signal and obtains a signal component of the fluorescence by dividing the detection signal in units of predetermined times corresponding to the phase of scattered light, individually amplifying each component of the divided detection signal, and synthesizing each of the amplified components. Thereafter, a fluorescent signal is converted into a digital value in the AD converter 80 and predetermined control/signal processing is performed in the CPU 90 so that a signal related to the fluorescence can be obtained.

Next, operation effects of the optical measurement device 1 described above will be described.

The optical measurement device 1 includes the detection optical system 20 for detecting detection light including fluorescence generated from the immuno-chromatography test piece 100 irradiated with excitation light from the irradiation optical system 10, and scattered light caused by the excitation light and having a phase equivalent to that of the excitation light; and the cancel circuit 60 for processing a detection signal corresponding to detection light. The cancel circuit 60 removes a signal component corresponding to scattered light from a detection signal on the basis of the phase difference between the fluorescence and the scattered light.

In such an optical measurement device 1, a signal component corresponding to scattered light is removed from a detection signal on the basis of the phase difference between fluorescence generated from the immuno-chromatography test piece 100 irradiated with excitation light (specifically, a fluorescent reagent of an antigen-antibody complex in the measurement target portion of the immuno-chromatographic membrane) and scattered light having a phase equivalent to that of the excitation light. That is, focusing on the fact that scattered light corresponding to a noise component of the light components included in detection light is light caused by the excitation light and has a phase equivalent to that of the excitation light, a signal component corresponding to the scattered light which is a noise component caused by the excitation light itself can be removed by removing a signal component having a phase equivalent to that of the excitation light from the detection signal. Specifically, since detection light may include not only light (fluorescence) generated from the immuno-chromatography test piece 100 (specifically, the fluorescent reagent of an antigen-antibody complex) but also light (scattered light) caused by the excitation light as noise components, fluorescence is detected with a slight delay with respect to scattered light (fluorescence has a phase difference with respect to scattered light). Therefore, only a signal component corresponding to scattered light can be appropriately removed from a detection signal by utilizing the phase difference. As above, according to the optical measurement device 1, scattered light which is a noise component caused by excitation light itself can be appropriately removed.

Regarding a technique for removing scattered light from detection light, it is assumed that the wavelength range of scattered light is removed by extracting only the wavelength range of fluorescence using a wavelength selection tool, specifically, a wavelength selection filter with respect to detection light. Also in the present embodiment, scattered light is removed to a certain degree by providing the fluorescence filter 22. However, when the excitation light wavelength and the fluorescence wavelength are close to each other, it is difficult to completely block scattered light having an excitation light wavelength using the fluorescence filter 22 while allowing fluorescence having a fluorescence wavelength to be appropriately transmitted therethrough. In addition, generally, characteristics of a wavelength selection filter change depending on an incident angle of light. Therefore, it is difficult to completely prevent entry of scattered light incident at various angles using the fluorescence filter 22, that is, by selecting a wavelength. In this regard, in the optical measurement device 1 of the present embodiment, signal processing for removing only scattered light is performed utilizing a phase difference between fluorescence and scattered light (that is, excitation light) in addition to optical wavelength selection using the fluorescence filter 22. Therefore, scattered light which cannot be completely blocked by the fluorescence filter 22 can also be appropriately removed. In addition, in order to remove scattered light using only a wavelength selection filter, for example, it is assumed that an optical system for having a uniform incident angle of scattered light with respect to the wavelength selection filter is provided. However, in this case, there is a problem that a configuration related to light detection increases in size. In this regard, the optical measurement device 1 of the present embodiment requires no optical system for having a uniform incident angle of scattered light, and thus miniaturization of the device can be realized.

In addition, furthermore, a method of measuring fluorescence using a time-resolved method utilizing a fluorescence lifetime such that all excitation light and signal light are input to a light detector and only a fluorescent component of a fluorescent reagent (for example, europium) having a long lifetime is taken out from a time-output signal waveform through digital processing using a gate circuit is known. However, in the method, in addition to the fact that a measurement system becomes complicated, ultra-high-speed time resolution is required in order to capture fluorescence having a short fluorescence lifetime (a fluorescence lifetime of approximately nanoseconds), and thus costs rise. In this regard, in the optical measurement device 1 of the present embodiment, focusing on the phase difference between excitation light (scattered light) and fluorescence, only a signal component corresponding to the fluorescence is taken out by removing a signal component corresponding to the scattered light from the detection signal. Such a technology can be easily realized by a timing control circuit and a division/synthesis circuit, and thus costs can be reduced. In addition, according to the optical measurement device 1, fluorescence of an organic dye having a fluorescence lifetime of several nanoseconds can also be detected by performing phase modulation at approximately 10 MHz.

Further, the cancel circuit 60 removes a signal component corresponding to scattered light from a detection signal by dividing the detection signal in units of predetermined times corresponding to the phase of scattered light (the phase of excitation light), individually amplifying each component of the divided detection signal, and synthesizing each of the amplified components. In this manner, in consideration of the phase of scattered light, a signal component corresponding to the scattered light can be appropriately removed by dividing the detection signal (division in units of predetermined times), amplifying each of the divided components, and synthesizing each of the amplified components such that only a signal component corresponding to the scattered light is removed. Further, since fluorescence has a phase difference with respect to the scattered light, even if signal processing for removing only a signal component corresponding to the scattered light is performed, a signal component corresponding to the fluorescence is not removed and only a signal component corresponding to the fluorescence can be appropriately taken out from the detection signal.

In addition, as described above, the first light is excitation light for exciting a sample. The second light is fluorescence emitted by a sample in response to excitation light. The third light includes at least one of excitation light and scattered light of the excitation light. Accordingly, a signal component corresponding to at least one of the excitation light and the scattered light of the excitation light can be appropriately removed and only a signal component corresponding to the fluorescence can be appropriately taken out from the detection signal including signal components corresponding to fluorescence and at least one of the excitation light and the scattered light of the excitation light.

Figure 6:
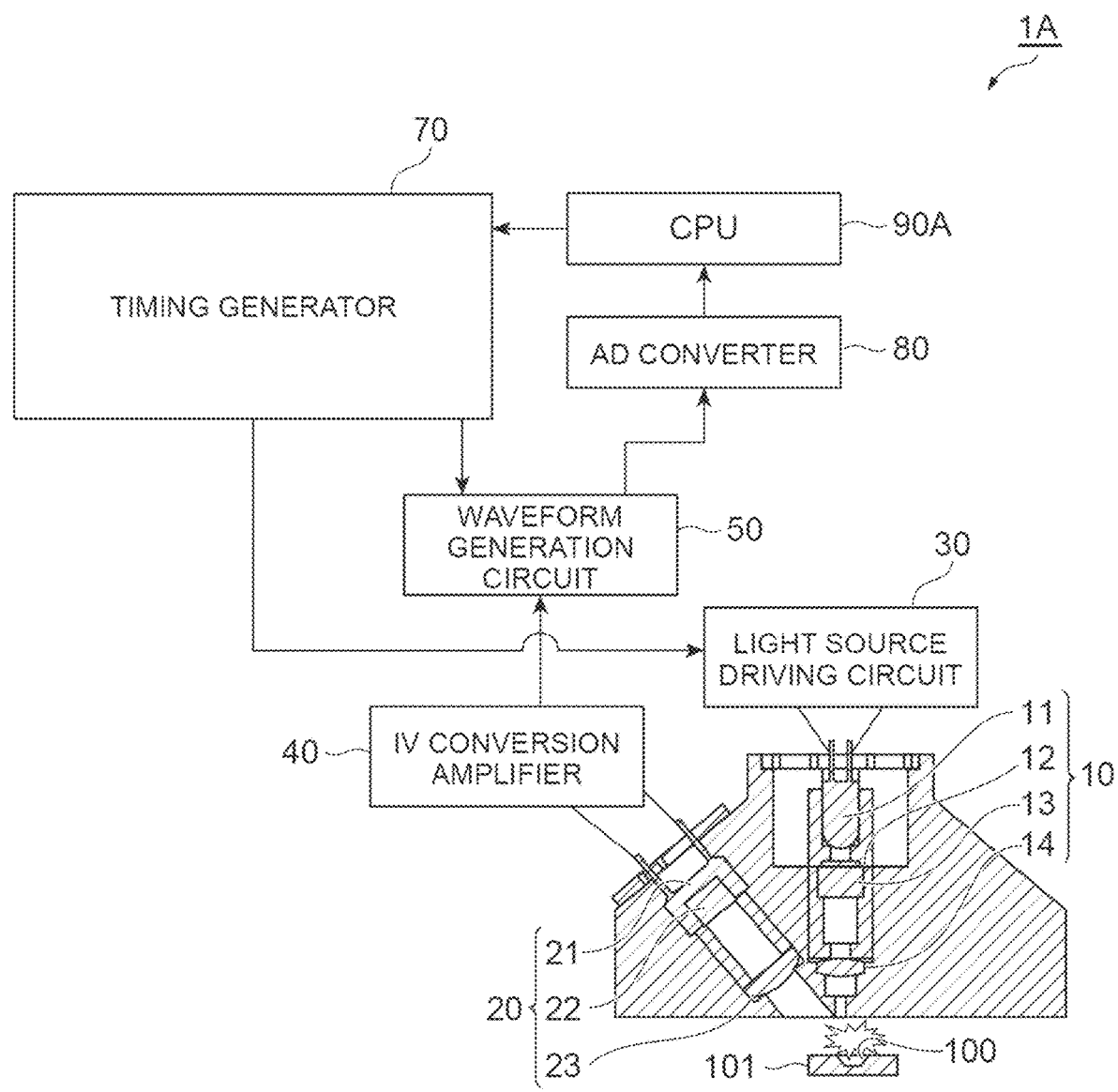
FIG. 6 is a view of a schematic configuration of an optical measurement device according to a modification example.

Hereinabove, the embodiment of the present invention has been described, but the present invention is not limited to the foregoing embodiment. For example, in the optical measurement device 1, description has been given such that the cancel circuit 60 removes a signal component corresponding to scattered light from a detection signal, but the configuration is not limited thereto. That is, as in an optical measurement device 1A illustrated in FIG. 6, without providing the cancel circuit 60, after A/D conversion in the AD converter 80, a CPU 90A (signal processing unit) may perform signal processing for removing a signal component corresponding to scattered light from a detection signal. In this case, there is no need to provide the cancel circuit 60, and this can contribute to miniaturization of the device.

In addition, the optical measurement device 1 need only irradiate a sample with first light and detect detection light including the second light generated from the sample and the third light caused by the first light and having a phase equivalent to that of the first light. The first light may be light other than excitation light, the second light may be light other than fluorescence, and the third light may be light other than scattered light.

It is assumed that this technology for removing a signal component corresponding to scattered light from a detection signal and detecting fluorescence or the like with high sensitivity is applied to various technical fields. For example, in a microplate reader, since an organic dye (for example, fluorescein) which has a fluorescence lifetime within a range of several nsec to several tens of nsec and is unlikely to be detected is used as a fluorescent dye, it is possible to expect that fluorescence can be detected with high sensitivity by applying this technology. Similarly, it is conceivable that this technology be also applied to the field of liquid chromatography. In addition, for example, in the field of DNA sequencers, amplified DNA is divided through capillary electrophoresis, and fluorescence of a fluorescent dye labeled in each of G, A, T, and C is read. Therefore, it is possible to expect that noise derived from excitation light is effectively removed and a high S/N signal is obtained by applying this technology. Similarly, also in the field of polymerase chain reaction (PCR), it is conceivable that this technology be applied.

Next, removal of a particular signal component (noise) described in the foregoing embodiment will be more specifically described with reference to FIGS. 7 to 16.

Figure 7:
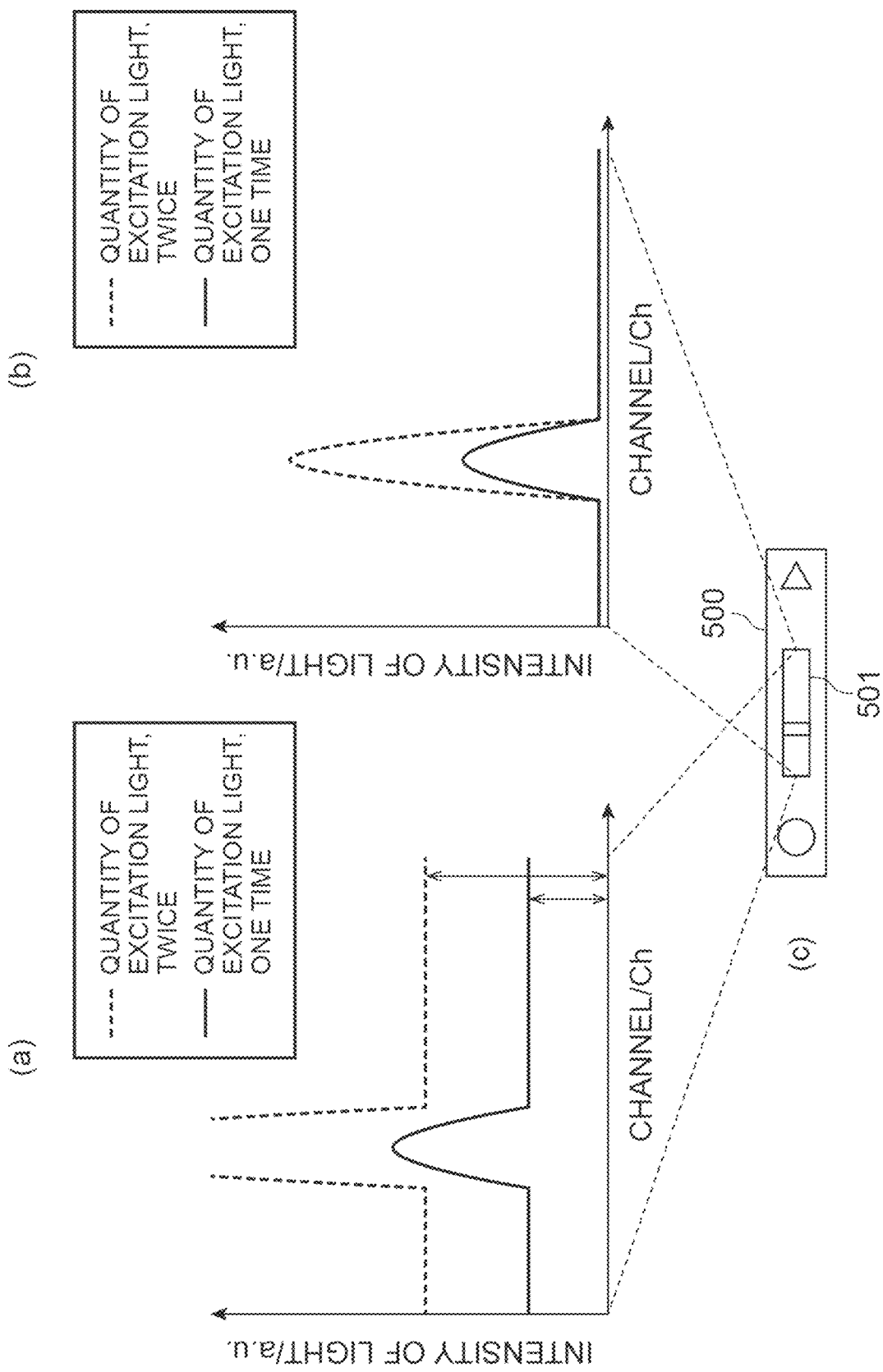
FIG. 7 is a view for describing removal of a noise component.
Figure 8:
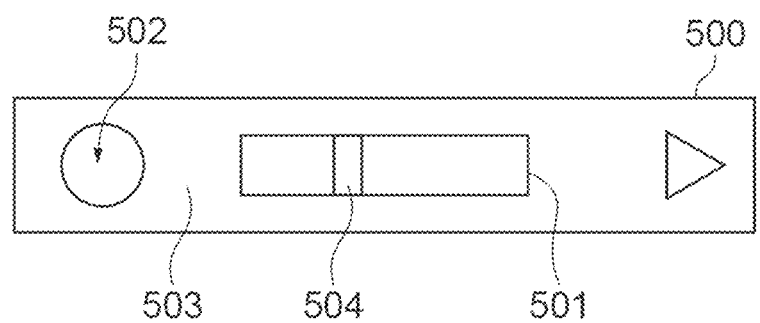
FIG. 8 is a view schematically illustrating a sample.

FIG. 7 is a view for describing removal of a noise component. FIG. 7(a) illustrates an intensity of detection light when a signal component corresponding to scattered light (noise) caused by excitation light is not removed, and FIG. 7(b) illustrates an intensity of detection light when a signal component corresponding to scattered light (noise) caused by excitation light is removed. In FIGS. 7(a) and 7(b), the vertical axis indicates intensity of detection light, and the horizontal axis indicates channel indicating a position in a measurement portion 501 which is a measurement area of a sample 500. One channel is 0.02 mm, for example. FIG. 7(c) is a view illustrating a region of the sample 500 corresponding to the position of the channel in FIGS. 7(a) and 7(b). FIG. 8 is an enlarged schematic view of the sample 500 illustrated in FIG. 7(c). As illustrated in FIG. 8, in the sample 500, a dripping portion 502 for dripping a specimen, a holding portion 503 for holding a detection antibody labeled with a fluorescent reagent, and the measurement portion 501 in which a capturing antibody is fixed to a measurement target portion 504 are disposed toward a downstream side from an upstream side. For example, the fluorescent reagent is DTBTA-$Eu^{3+}$. For example, since the measurement portion 501 is a part of a white immunochromatographic membrane, excitation light is likely to scatter.

In such sample 500, when a specimen is dripped into the dripping portion 502, the specimen moves to the downstream side due to a capillary phenomenon. When there is a substance to be detected in the specimen, the detection antibody in the holding portion 503 and the substance to be detected react and form a complex, and this complex moves to the downstream side in the measurement portion 501. Further, when the complex arrives at the measurement target portion 504 on the measurement portion 501, the complex is captured by the capturing antibody in the measurement target portion 504, and thus a complex including three elements such as the substance to be detected, the detection antibody, and the capturing antibody is formed. In this state, by irradiating the measurement portion 501 (measurement area) with excitation light while a condensing position (channel) is changed, the intensity of detection light of each channel as illustrated in FIGS. 7(a) and 7(b) can be derived out. In FIGS. 7(a) and 7(b), the channel having a greater intensity of detection light than other channels is a channel corresponding to the position of the measurement target portion 504 in which the complex is captured.

As illustrated in FIG. 7(a), when a signal component corresponding to scattered light (noise) is not removed, since detection light includes not only fluorescence but also scattered light, the intensity of detection light becomes significant. Further, such noise increases as the quantity of excitation light is increased. Therefore, as illustrated in FIG. 7(a), when the quantity of excitation light is doubled, noise is also doubled in a similar manner. Generally, regarding a method for improving S/N, a method of increasing the quantity of fluorescent signal by increasing the quantity of excitation light may be considered. However, as described above, in a form in which noise also increases in accordance with the quantity of excitation light as in FIG. 7(a), it is difficult to improve S/N. Moreover, there is also a problem that a dynamic range is narrowed due to the increased quantity of excitation light.

On the other hand, as illustrated in FIG. 7(b), when a signal component corresponding to scattered light (noise) is removed, substantially only fluorescence is included in the detection light, and thus only a signal desired to detect (a signal based on fluorescence) can be detected. In this case, noise is almost zero. Therefore, as illustrated in FIG. 7(b), even if the quantity of excitation light is increased (for example, even if it is doubled), unless the light detector is saturated, an influence of excitation light (scattered light) can be canceled to almost zero so that noise can be prevented from extremely increasing. As above, in the configuration of removing noise as illustrated in FIG. 7(b), when excitation light is increased, only the signal component can be increased in a state in which the noise component is canceled to almost zero, and thus this leads to improvement in S/N. Since the configuration is extremely resistant to a noise component, the quantity of excitation light can be increased or a multiplication factor of an IV conversion amplifier can be raised.

Figure 9:
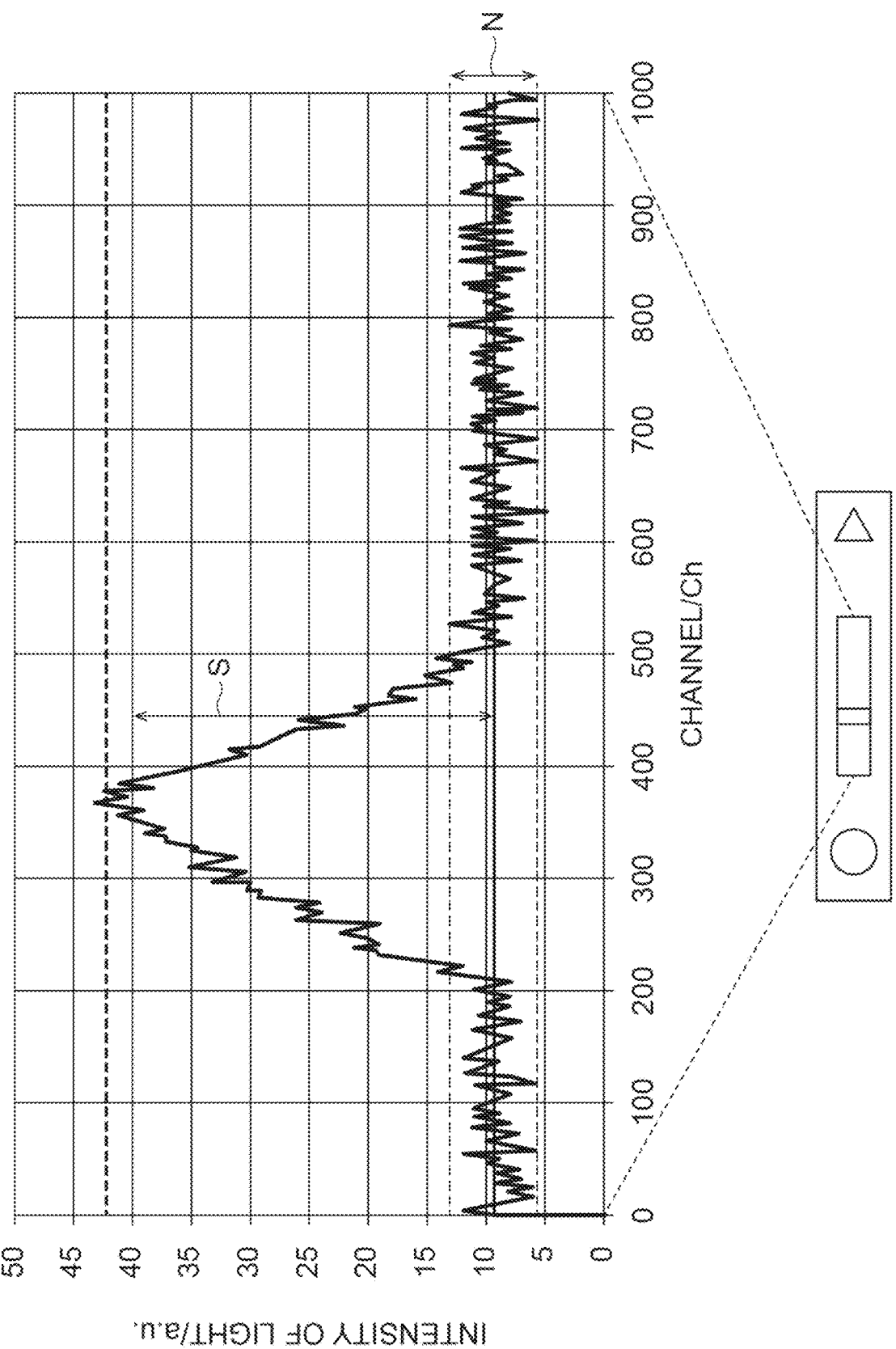
FIG. 9 is a view for describing a definition of S/N.

FIG. 9 is a view for describing a definition of S/N. FIG. 9 illustrates an example of the intensity of detection light (the intensity of detection light at each position in the measurement area) of each channel. As illustrated in FIG. 9, a fluctuation component of approximately ±4 is present near 10 counts of the intensity of detection light. Such fluctuation (standard deviation) in quantity of base light is a value acquired by scanning the measurement portion 501 which is not coated with any of a fluorescent substance and the like (alternatively, the measurement portion 501 in a wet state similar to the measurement state) with excitation light. Hereinafter, the fluctuation in quantity of base light will be defined as noise N. In addition, a signal S will be defined as "a value obtained by subtracting an average value of the noise components excluding the position of the measurement target portion 504 in all channels from the peak intensity of fluorescence in the measurement target portion 504". S/N will be defined as a value obtained by dividing the signal defined above by noise.

In the example illustrated in FIG. 9, the value of noise is offset by approximately 10 counts. In principle, the value of noise is canceled to almost zero by performing calibration processing, which will be described below. However, since there is unevenness in a background corresponding to the value of noise, from the viewpoint of analysis using software, it is preferable that the signal be a positive value at all times. Therefore, offset processing is performed for the background. The amount of offset is set such that the signal is settled within the dynamic range (within 0 to 4,096 counts). The amount of offset is set such that it becomes as small as possible from the viewpoint of the dynamic range and a signal of the background obtained by scanning the measurement portion 501 with excitation light has a positive value at all times (almost reliably). Specifically, for example, the amount of offset may be a value of the sum of an average value of the intensity of detection light acquired by scanning the measurement portion 501 which is not coated with any of a fluorescent substance and the like (alternatively, the measurement portion 501 in a wet state similar to the measurement state) with excitation light and 6σ of the average value of the intensity. In preparation for a case in which a sudden noise jumps into a circuit system, a final amount of offset may be set by adding a suitable margin to the amount of offset calculated as above. The amount of offset may be selected such that the dynamic range is not sacrificed and a signal is not output as a negative value. For example, it may be approximately +20 counts.

Next, a technique for removing a signal component corresponding to scattered light (noise) will be described in detail. In the optical measurement device 1, calibration processing is performed in the cancel circuit 60 (lock-in circuit), and a signal component corresponding to scattered light (noise) is removed from a detection signal in consideration of a result of the performed calibration processing.

Specifically, in the optical measurement method using the optical measurement device 1, first, an optical head of the irradiation optical system 10 is disposed such that places other than the measurement target portion 504 of the sample 500 are irradiated with excitation light. Subsequently, scattered light caused when the measurement portion 501 or the like is irradiated with excitation light from the irradiation optical system 10 (a component of excitation light which has scattered in the measurement portion 501 or the like) is detected in the detection optical system 20. Here, basically, the light detected in the detection optical system 20 is light of only scattered light which does not include at least the fluorescence in the measurement target portion 504 and is calibration processing light used for calibration processing.

Figure 13:
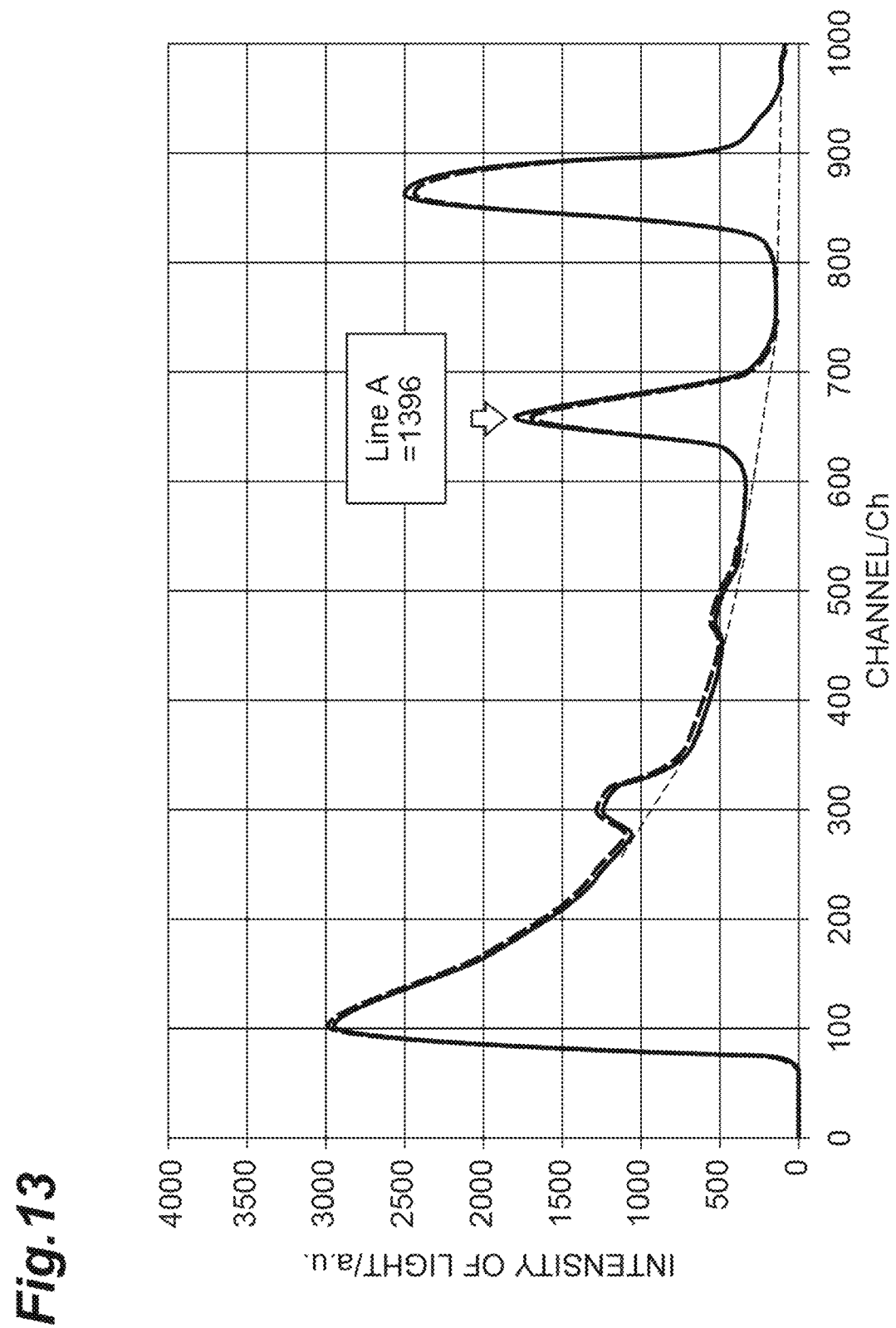
FIG. 13 is a view for describing details of an intensity of fluorescence in each region of a sample.

Acquisition of calibration processing light will be described in more detail. Calibration processing light may be detected by irradiating the area on the downstream side of the capturing antibody fixed to the measurement target portion 504 in the sample 500 with excitation light. FIG. 13 is a view for describing the intensity of fluorescence in each region of the sample 500. In FIG. 13, the place marked with "Line A" indicates a place of the measurement target portion 504. In description of FIGS. 7(a) and 7(b) and the like, for the sake of convenience of description, the intensities of fluorescence other than that of the measurement target portion 504 are indicated such that they are low. However, actually, as illustrated in FIG. 13, the intensity of fluorescence is likely to be significant on the upstream side where the specimen is dripped even if no capturing antibody is present. For this reason, it is preferable that calibration processing light desired to have only scattered light be detected by irradiating the area on the downstream side of the capturing antibody fixed onto the measurement target portion 504 in the sample 500 with excitation light. Calibration processing light may be acquired using a case for accommodating an immuno-chromatographic membrane or a separately prepared member for calibration processing in addition to the measurement portion 501 in the sample 500.

Subsequently, calibration processing is performed. Specifically, the cancel circuit 60 of the optical measurement device 1 performs calibration processing for removing a signal component corresponding to scattered light from a detection signal on the basis of a calibration signal corresponding to the calibration processing light described above. Details of calibration processing will be described below. Further, after calibration processing is completed, fluorescence information of the measurement portion 501 is acquired by scanning a part on the measurement area (measurement portion 501) of the sample 500 with the optical head of the irradiation optical system 10. Specifically, the cancel circuit 60 acquires the fluorescence information by removing a signal component corresponding to scattered light from a detection signal in consideration of the result of the performed calibration processing described above.

Next, details of calibration processing will be described. For example, the cancel circuit 60 of the optical measurement device 1 is a lock-in circuit utilizing a field programmable gate array (FPGA). In calibration processing, the cancel circuit 60 generates a lock-in switch signal having a phase shifted with respect to a cycle signal marking a cycle by an operation frequency of the cancel circuit 60 according to the modulation frequency of the light source 11 (for example, a frequency of a direct digital synthesizer (DDS)) set by the light source driving circuit 30. Further, the cancel circuit 60 which functions as a lock-in circuit outputs a signal component corresponding to scattered light when a calibration signal (measurement signal) and a switch signal (reference signal) are input and adjusts the phase of the switch signal such that the voltage value of the signal component corresponding to the scattered light is within a predetermined range (slash level) approximating zero.

Figure 10:
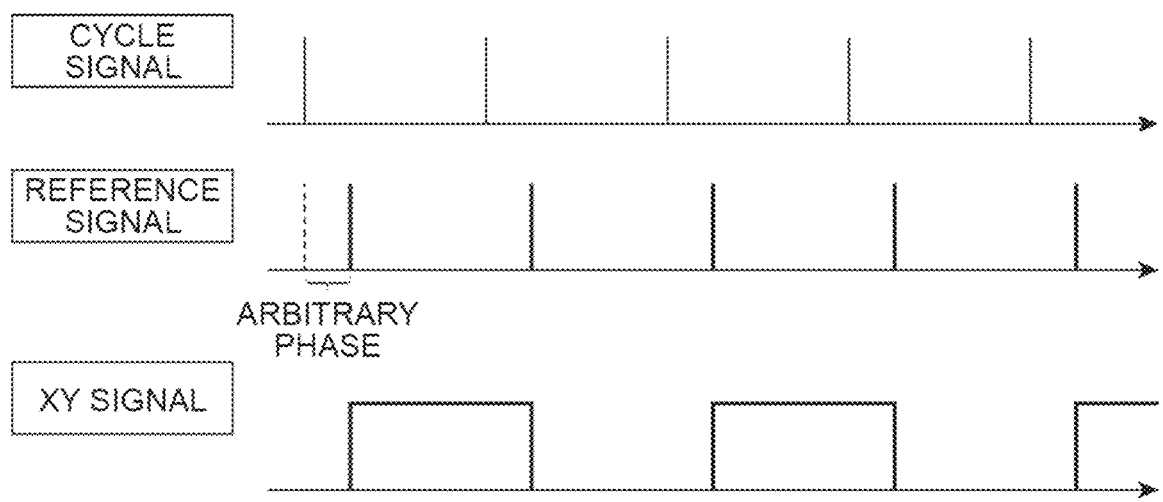
FIG. 10 is a view for describing a signal used in calibration processing.

FIG. 10 illustrates a signal used for calibration processing inside the FPGA of the cancel circuit 60. The cycle signal illustrated in FIG. 10 is a clock signal marking a cycle in accordance with the frequency of the DDS as described above. The reference signal is a signal having the same frequency as the cycle signal in an arbitrary phase from the cycle signal (the phase has been shifted with respect to the cycle signal) and is a trigger for an XY signal which will be described below. The XY signal is a lock-in switch signal described above and is a signal produced by having the reference signal as a trigger. An X signal (first signal) is a signal having no phase difference with respect to the reference signal. A Y signal (second signal) is a signal having a phase shifted by 90 degrees with respect to the reference signal. Actually, the cancel circuit 60 further generates an X' signal (third signal) realized by inverting the X signal and a Y' signal (fourth signal) realized by inverting the Y signal in addition to the X signal and the Y signal. Each of the X signal, the Y signal, the X' signal, and the Y' signal is generated by the independently dedicated circuit. Adjusting the phase of a switch signal such that the voltage value of a signal component corresponding to scattered light is in the slash level denotes that the phase of the reference signal is continuously shifted with respect to the cycle signal until the output from the cancel circuit 60 becomes 0 V (or a value approximating it).

FIG. 11 is a view for describing processing for performing adjustment such that the output becomes 0 V by shifting the phase of the reference signal with respect to the cycle signal. Currently, it is assumed that a relationship between the phases of the cycle signal, the reference signal, and the switch signal in the initial state is in the state illustrated in FIG. 11(a). Further, it is assumed that integration processing is performed for the hatching section in FIG. 11 on the basis of the switch signal and an output (a voltage value of a signal component corresponding to scattered light) has a positive value not in the slash level. In this case, as illustrated in FIG. 11(b), the phase of the reference signal is adjusted such that the phase of the switch signal is delayed. That is, in calibration processing, the cancel circuit 60 performs adjustment such that the phase of the switch signal is delayed when the voltage value of a signal component corresponding to scattered light has a positive value not in the slash level.

Currently, it is assumed that an output (a voltage value of a signal component corresponding to scattered light) has a positive value not in the slash level as a result of integration processing of the hatching section also in the state of FIG. 11(b) in which the phase of the switch signal is adjusted. In this case, as illustrated in FIG. 11(c), the phase of the reference signal is adjusted such that the phase of the switch signal is further delayed.

Currently, it is assumed that an output (a voltage value of a signal component corresponding to scattered light) has a positive value not in the slash level as a result of integration processing of the hatching section also in the state of FIG. 11(c) in which the phase of the switch signal is adjusted. In this case, as illustrated in FIG. 11(d), the phase of the reference signal is adjusted such that the phase of the switch signal is further delayed.

Currently, it is assumed that an output (a voltage value of a signal component corresponding to scattered light) has a negative value not in the slash level as a result of integration processing of the hatching section in the state of FIG. 11(d) in which the phase of the switch signal is adjusted. In this case, as illustrated in FIG. 11(e), the phase of the reference signal is adjusted such that the phase of the switch signal advances. That is, in calibration processing, the cancel circuit 60 performs adjustment such that the phase of the switch signal advances when the voltage value of a signal component corresponding to scattered light has a negative value not in the slash level.

Further, as a result of performing the adjustment such that the phase of the switch signal advances, as illustrated in FIG. 11(e), when an output (a voltage value of a signal component corresponding to scattered light) is in the slash level (a value within a predetermined range approximating zero) as a result of integration processing of the hatching section, calibration processing is completed.

When calibration processing is completed, the cancel circuit 60 removes a signal component corresponding to the scattered light component from the detection signal when a detection signal corresponding to detection light including the fluorescent component and the scattered light component (excitation light component) and the switch signal having the phase adjusted in calibration processing are input.

Figure 15:
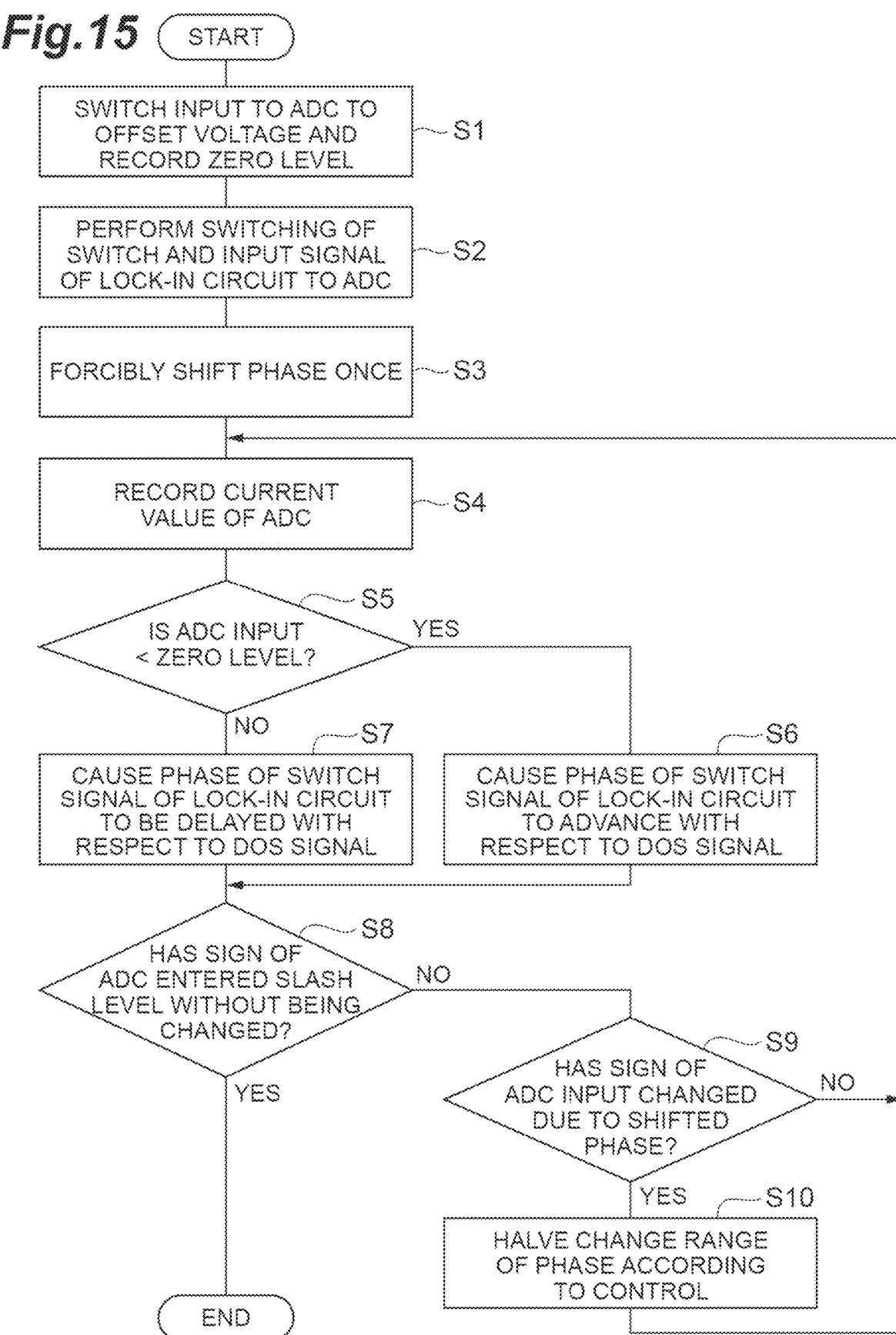
FIG. 15 is a flowchart illustrating calibration processing.

FIG. 15 is a flowchart illustrating calibration processing. As illustrated in FIG. 15, in calibration processing, first, an input to an AD converter is switched to a predetermined offset voltage, and the zero level is stored (Step S1). Further, a signal of the cancel circuit 60 (lock-in circuit) is input to the AD converter by switching the switch (Step S2). In this state, the phase of the reference signal is forcibly shifted once (Step S3). The output of the cancel circuit 60 (lock-in circuit) becomes 0 V when the phase of the reference signal with respect to the cycle signal is at zero degrees and 180 degrees. However, when the phases incidentally match with each other at 180 degrees in the initial state, calibration processing may be erroneously completed and the positive/negative sign of the output signal may be inverted. Therefore, an output signal may not be detected depending on a configuration of the circuit in the latter stage. In this regard, calibration processing can be prevented from being erroneously completed by forcibly shifting the phase of the reference signal at the time of starting. In addition, the positive/negative sign of the output signal is fixed by matching the phases at the time of starting in this manner. As a result, there is no need to have a sign bit when an output signal is converted into a digital value, and thus the dynamic range of the AD converter can be effectively used. In addition, when it is desired to perform measurement with a negative output, the phase when calibration is completed may be set to 180 degrees instead of zero degrees.

When Step S3 is completed, a current input value of the AD converter is recorded (Step S4), and loop processing of calibration is executed. First, the current input value of the AD converter and the zero level are compared to each other, and it is determined whether or not the input value of the AD converter is smaller than the zero level (whether it is a negative value) (Step S5). When it is determined in Step S5 that the input value of the AD converter is a negative value, the phase of the switch signal (that is, a reference signal) of the cancel circuit 60 with respect to the cycle signal corresponding to the frequency of the DDS advances (Step S6). On the other hand, when it is determined in Step S5 that the input value of the AD converter is a positive value, the phase of the switch signal (that is, a reference signal) of the cancel circuit 60 with respect to the cycle signal is delayed (Step S7).

Further, regarding the input value of the AD converter, it is determined whether or not the value is in the slash level without having the sign changed (Step S8). When it is determined in Step S8 that the value is in the slash level without having the sign changed, calibration processing ends. On the other hand, when it is determined in Step S8 that the conditions are not satisfied, it is determined whether or not the sign of the input of the AD converter has changed by shifting the phase (Step S9). When it is determined in Step S9 that the sign thereof has not changed, the processing of Step S4 is performed again. When it is determined that the sign thereof has changed, the change range of the phase according to control is changed to half the current range (Step S10), and the processing of Step S4 is performed again. Hereinabove, calibration processing has been described.

Figure 14:
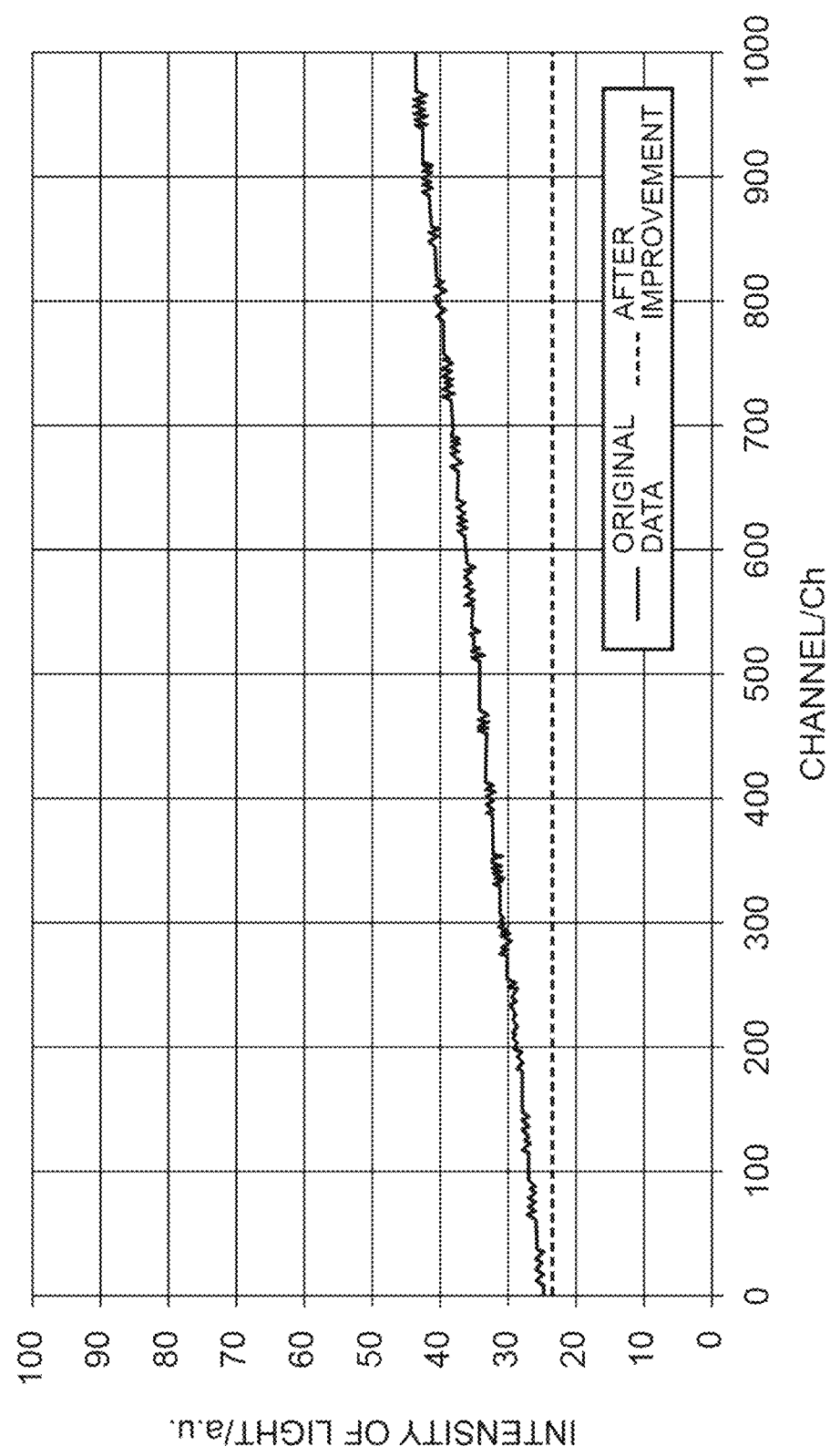
FIG. 14 is a view for describing an effect of a measure for drift of a signal.

Next, synchronization processing of the modulation frequency of the light source 11 (for example, a frequency of a direct digital synthesizer (DDS)) set by the light source driving circuit 30 and the operation frequency of the cancel circuit 60 which is a lock-in circuit utilizing a field programmable gate array (FPGA) will be described. When performing phase difference fluorescence measurement using a lock-in circuit, there is a need for the modulation frequency of the light source 11 and the operation frequency of the lock-in circuit to be very strictly synchronized with each other. When the modulation frequency of the light source 11 and the operation frequency of the lock-in circuit deviate from each other, even if the output of the lock-in circuit is set to zero through calibration processing described above, frequency deviations, that is, phase differences are accumulated with the lapse of time as illustrated in FIG. 14, and thus the output is drifted (refer to the graph marked as "original data" in FIG. 14). In this manner, when synchronization processing is not appropriately performed, the fluorescence cannot be accurately measured due to an influence of scattered light. That is, since a cycle signal marking a cycle at the operation frequency of the lock-in circuit is not synchronized with the modulation frequency of the light source 11, the reference signal and the switch signal generated on the basis of the cycle signal do not become appropriate signals, and thus the fluorescence cannot be accurately measured.

Here, the lock-in circuit utilizing an FPGA and the DDS performing modulation of the light source 11 are operated at timings different from each other. Therefore, it is not possible to modulate the light source 11 at a desired frequency and to make the operation frequencies of both completely the same as each other. Here, in this form, a frequency deviation between the lock-in circuit and the DDS is reduced to an extent that it practically causes no problem by setting two kinds of operation frequencies for the FPGA and performing operation while switching between the operation frequencies of two kinds at a predetermined proportion. That is, for example, in consideration of the total time during which the lock-in circuit is driven ten times, instead of having all the operation frequencies to be the same as each other, for example, a frequency deviation between the lock-in circuit and the DDS during the total time in which the lock-in circuit is driven ten times can be reduced by performing setting such as setting the operation frequency of the FPGA to be higher than the operation frequency of the DDS for eight times out of ten times and setting the operation frequency of the FPGA to be lower than the operation frequency of the DDS for twice out of ten times. In this manner, by reducing the frequency deviation, as illustrated in FIG. 14, drift of an output can be reduced (refer to the graph marked as "after improvement" in FIG. 14). Even if two kinds of operation frequencies are set for the DDS to switch therebetween instead of the operation frequency of the FPGA, similar effects can be obtained.

Lastly, operation effects of the form described above will be described. In this form, calibration processing light not including fluorescence and including scattered light is detected, calibration processing for removing a signal component corresponding to scattered light from a detection signal is performed on the basis of the calibration signal corresponding to the calibration processing light, and a signal component corresponding to scattered light is removed from a detection signal in consideration of a result of the performed calibration processing. A signal component corresponding to scattered light can be appropriately removed from a detection signal by performing calibration processing for removing a signal component corresponding to scattered light from a detection signal in advance on the basis of the calibration processing light including the scattered light.

In this manner, effects of appropriately removing scattered light (noise) will be described with reference to FIG. 16. FIG. 16(*a*) illustrates an intensity of detection light when a signal component corresponding to scattered light (noise) is not removed, and FIG. 16(*b*) illustrates an intensity of detection light when a signal component corresponding to scattered light (noise) is removed. FIG. 16 illustrates results when a membrane coated with DTBTA-Eu$^{3+}$ as the fluorescent reagent is measured. As illustrated in FIG. 16(*a*), when noise is not removed, there is a need to perform offset by approximately 330 counts for the background (BKG) of excitation light (scattered light). Further, noise (standard deviation) is 2.16, and the signal intensity is 404 counts. In contrast, as illustrated in FIG. 16(*b*), when noise is removed, there is no need to perform offset in consideration of the fact that excitation light scatters on the membrane, and only necessary minimum offset is performed for processing (processing for making all the signals to have a positive value) using software. Further, noise (standard deviation) can be set to 0.69, and the signal intensity can be set to 1,475 counts. In this manner, when noise is removed, since the amount of offset is small, the quantity of excitation light from the light source and the amplification factor for the IV conversion amplifier can be increased, and the signal intensity can be favorably increased. As a result, S/N when noise is not removed becomes 187, whereas S/N when noise is removed can become 2,140, and thus S/N can be improved by ten times or greater.

In calibration processing, a lock-in switch signal having a phase shifted with respect to a cycle signal marking a cycle by the operation frequency of the cancel circuit 60 according to the modulation frequency of the light source 11 may be generated, a signal component corresponding to scattered light may be output when the calibration signal and the switch signal are input, and the phase of the switch signal may be adjusted such that the voltage value of a signal component corresponding to the scattered light is within a predetermined range approximating zero. A signal component corresponding to scattered light may be removed from a detection signal when the detection signal and the switch signal having the phase adjusted in calibration processing are input. In this manner, when the phase of a switch signal is adjusted using the lock-in circuit such that the voltage value of a signal component corresponding to scattered light becomes a value approximating zero in calibration processing, a signal component corresponding to scattered light can be appropriately removed from a detection signal when the switch signal after phase adjustment is input.

In calibration processing, the phase of a switch signal may be adjusted such that the phase is delayed when the voltage value of a signal component corresponding to scattered light is not within the predetermined range but is larger than a value within the predetermined range, and the phase of a switch signal may be adjusted such that the phase advances when the voltage value of a signal component corresponding to scattered light is not within the predetermined range but is smaller than a value within the predetermined range. Accordingly, the voltage value of a signal component corresponding to scattered light can be appropriately adjusted to a value close to zero in calibration processing.

The modulation frequency of the light source 11 may be set to be lower than a value corresponding to the fluorescence lifetime indicating a period of time taken until the intensity of fluorescence drops from the peak value to 1/e. When the modulation frequency is raised to a value approximately corresponding to the fluorescence lifetime, consecutive signals may overlap each other, and thus the intensity of fluorescence cannot be maximized. In this regard, since the modulation frequency is set to be lower than a value corresponding to the fluorescence lifetime, the intensity of fluorescence can be appropriately enhanced.

The modulation frequency of the light source 11 may be set to be lower than a value corresponding to the fluorescence lifetime and higher than a commercial frequency. Accordingly, the modulation frequency becomes higher than a value corresponding to the fluorescence lifetime, and thus increase in noise can be avoided while avoiding decrease in intensity of the fluorescence.

As lock-in switch signals, the X signal, the Y signal having a phase shifted with respect to the X signal by 90 degrees, the X' signal realized by inverting the X signal, and the Y' signal realized by inverting the Y signal may be generated using independently dedicated circuits. Since inverted signals are generated using independently dedicated circuits, it is possible to prevent occurrence of a minute delay which may become a problem when inverted signals are generated, for example, using a NOT circuit (a minute delay caused when passing through a NOT circuit).

The cancel circuit 60 (lock-in circuit) may be set by switching between the operation frequencies of two kinds at a predetermined proportion. Accordingly, compared to a case of having an operation frequency of one kind, the operation frequency of the lock-in circuit is more likely to match with the modulation frequency of the light source 11, and thus synchronization accuracy thereof can be improved.

Calibration processing light may be detected by irradiating the area on the downstream side of the capturing antibody fixed to the measurement target portion 504 in the sample 500 with excitation light. Since a fluorescent component is likely to stay on the upstream side of the capturing antibody, calibration processing light in which an influence of the fluorescent component is reduced can be appropriately detected by irradiating the area on the downstream side of the capturing antibody with excitation light and detecting the calibration processing light.

REFERENCE SIGNS LIST 1, 1A Optical measurement device
10 Irradiation optical system (light source unit)
20 Detection optical system (light detection unit)
30 Light source driving circuit
60 Cancel circuit (signal processing unit)
100 Immuno-chromatography test piece (sample)

The invention claimed is:

1. An optical measurement device comprising:
a light detection unit configured to detect detection light including second light generated from a sample irradiated with first light and third light caused by the first light and having a phase equivalent to a phase of the first light; and
a signal processing unit configured to perform processing of a detection signal corresponding to the detection light,
wherein the signal processing unit removes a signal component corresponding to the third light from the detection signal on the basis of a phase difference between the second light and the third light,
wherein the first light is excitation light for exciting the sample,
wherein the second light is fluorescence emitted by the sample in response to the excitation light,
wherein the third light includes at least one of the excitation light and scattered light of the excitation light,
wherein the light detection unit detects calibration processing light not including the second light and including the third light, and
wherein the signal processing unit performs calibration processing for removing a signal component corresponding to the third light from the detection signal on the basis of a calibration signal corresponding to the calibration processing light and removes a signal component corresponding to the third light from the detection signal in consideration of a result of the performed calibration processing.

2. The optical measurement device according to claim 1, wherein the signal processing unit removes a signal component corresponding to the third light from the detection signal by dividing the detection signal in units of predetermined times corresponding to the phase of the third light, individually amplifying each component of the divided detection signal, and synthesizing each of the amplified components.

3. The optical measurement device according to claim 1 further comprising:
a light source driving circuit configured to set a modulation frequency of a light source outputting the first light,
wherein the signal processing unit
generates a lock-in switch signal having a phase shifted with respect to a cycle signal marking a cycle by an operation frequency of the signal processing unit according to the modulation frequency of the light source set by the light source driving circuit, outputs a signal component corresponding to the third light when the calibration signal and the switch signal are input, and adjusts the phase of the switch signal such that a voltage value of a signal component corresponding to the third light is within a predetermined range approximating zero in the calibration processing, and
removes a signal component corresponding to the third light from the detection signal when the detection signal and the switch signal having the phase adjusted in the calibration processing are input.

4. The optical measurement device according to claim 3, wherein the signal processing unit adjusts the phase of the switch signal such that the phase is delayed when the voltage value of a signal component corresponding to the third light is not within the predetermined range but is larger than a value within the predetermined range and adjusts the phase of the switch signal such that the phase advances when the voltage value of a signal component corresponding to the third light is not within the predetermined range but is smaller than a value within the predetermined range in the calibration processing.

5. The optical measurement device according to claim 3, wherein the light source driving circuit sets the modulation frequency of the light source to be lower than a value corresponding to a fluorescence lifetime indicating a period of time taken until an intensity of the second light drops from a peak value to 1/e.

6. The optical measurement device according to claim 5, wherein the light source driving circuit sets the modulation frequency of the light source to be lower than a value corresponding to the fluorescence lifetime and higher than a commercial frequency.

7. The optical measurement device according to claim 3, wherein the signal processing unit generates, as the lock-in switch signals, a first signal, a second signal having a phase shifted with respect to the first signal by 90 degrees, a third signal realized by inverting the first signal, and a fourth signal realized by inverting the second signal using independently dedicated circuits.

8. The optical measurement device according to claim 3, wherein the signal processing unit is set by switching between the operation frequencies of two kinds at a predetermined proportion.

9. An optical measurement method comprising:
irradiating a sample with first light;
detecting detection light including second light generated from the sample irradiated with the first light and third light caused by the first light and having a phase equivalent to a phase of the first light;
removing a signal component corresponding to the third light from a detection signal corresponding to the detection light on the basis of a phase difference between the second light and the third light;
detecting calibration processing light not including the second light and including the third light; and
performing calibration processing for removing a signal component corresponding to the third light from the detection signal on the basis of a calibration signal corresponding to the calibration processing light and removing a signal component corresponding to the third light from the detection signal in consideration of a result of the performed calibration processing.

10. The optical measurement method according to claim 9 further comprising:
generating a lock-in switch signal having a phase shifted with respect to a cycle signal marking a cycle in accordance with a modulation frequency of a light source, outputting a signal component corresponding to the third light when the calibration signal and the switch signal are input, and adjusting the phase of the switch signal such that a voltage value of a signal component corresponding to the third light is within a predetermined range approximating zero in the calibration processing; and removing a signal component corresponding to the third light from the detection signal when the detection signal and the switch signal having the phase adjusted in the calibration processing are input.

11. The optical measurement method according to claim 10,
wherein in the calibration processing, the phase of the switch signal is adjusted such that the phase is delayed when the voltage value of a signal component corresponding to the third light is not within the predetermined range but is larger than a value within the predetermined range, and the phase of the switch signal is adjusted such that the phase advances when the voltage value of a signal component corresponding to the third light is not within the predetermined range but is smaller than a value within the predetermined range.

12. The optical measurement method according to claim 9,
wherein in the sample, a dripping portion for dripping a specimen, a holding portion for holding a detection antibody labeled with a fluorescent reagent, and a measurement portion for fixing a capturing antibody are disposed toward a downstream side from an upstream side, and
wherein the calibration processing light is detected by irradiating an area on the downstream side of the capturing antibody in the sample with the first light.

* * * * *